United States Patent
Itoh et al.

(10) Patent No.: US 10,778,116 B2
(45) Date of Patent: Sep. 15, 2020

(54) THREE-PHASE INVERTER WITH REDUCED DC BUS CAPACITOR RIPPLE

(71) Applicants: National University Corporation Nagaoka University of Technology, Niigata (JP); FUJI ELECTRIC CO., LTD., Kanagawa (JP)

(72) Inventors: Junichi Itoh, Niigata (JP); Koroku Nishizawa, Niigata (JP); Akio Toba, Tokyo (JP); Akihiro Odaka, Tokyo (JP)

(73) Assignees: National University Corporation Nagaoka University of Technology, Niigata (JP); FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

(21) Appl. No.: 16/279,179

(22) Filed: Feb. 19, 2019

(65) Prior Publication Data

US 2019/0334454 A1 Oct. 31, 2019

(30) Foreign Application Priority Data

Apr. 27, 2018 (JP) ................. 2018-085899

(51) Int. Cl.
*H02M 7/537* (2006.01)
*H02M 1/14* (2006.01)

(52) U.S. Cl.
CPC .............. *H02M 7/537* (2013.01); *H02M 1/14* (2013.01)

(58) Field of Classification Search
CPC ... H02M 2007/53878; H02M 7/53873; H02M 1/14
See application file for complete search history.

(56) References Cited

U.S. PATENT DOCUMENTS

| 10,320,323 B1* | 6/2019 | Wu ..................... H02P 27/085 |
| 2011/0164443 A1* | 7/2011 | Chen ................. H02M 7/53873 363/132 |

(Continued)

FOREIGN PATENT DOCUMENTS

WO 2018/061433 4/2018

OTHER PUBLICATIONS

K. Nishizawa et al., "Space Vector Modulation to Reduce Input Current Harmonics of two-level VSI Corresponding to the Power Factor Change", Institute of Electrical Engineers of Japan, Hokkaido Branch, SPC-15-133, Aug. 28, 2015, 1-6 pages, with Concise explanation.

(Continued)

*Primary Examiner* — Harry R Behm
(74) *Attorney, Agent, or Firm* — IPUSA, PLLC

(57) ABSTRACT

A three-phase inverter includes three series circuits that are connected in parallel to a capacitor connected in parallel to a DC voltage source. Each of the three series circuits includes two semiconductor switching elements connected in series. A connection point between the two semiconductor switching elements is used as an AC output terminal for each phase. The three-phase inverter generates PWM pulses of three phases including a PWM pulse of one phase, whose pulse width of a positive side pulse in one switching cycle is the largest, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse.

8 Claims, 22 Drawing Sheets

(56) References Cited

U.S. PATENT DOCUMENTS

2015/0303844 A1\* 10/2015 Ajima .................... B62D 5/046
　　　　　　　　　　　　　　　　　　　　　318/400.13
2015/0349626 A1\* 12/2015 Jiang ....................... H02M 1/44
　　　　　　　　　　　　　　　　　　　　　363/39

OTHER PUBLICATIONS

Toba et al., U.S. Appl. No. 16/180,231, filed Nov. 5, 2018 which is corresponding to WO2018/061433, 127 pages.

\* cited by examiner

FIG.11

| VOLTAGE VECTOR | $(S_u, S_v, S_w)$ | $i_{DCin}$ |
|---|---|---|
| $V_1$ | (1, 0, 0) | $i_u$ |
| $V_2$ | (1, 1, 0) | $-i_w (= i_u + i_v)$ |
| $V_3$ | (0, 1, 0) | $i_v$ |
| $V_4$ | (0, 1, 1) | $-i_u (= i_v + i_w)$ |
| $V_5$ | (0, 0, 1) | $i_w$ |
| $V_6$ | (1, 0, 1) | $-i_v (= i_u + i_w)$ |
| $V_0$ | (0, 0, 0) | 0 |
| $V_7$ | (1, 1, 1) | 0 |

THREE-PHASE INVERTER WITH REDUCED DC BUS CAPACITOR RIPPLE

CROSS-REFERENCE TO RELATED APPLICATION

The present application is based on and claims priority to Japanese Patent Application No. 2018-085899 filed on Apr. 27, 2018, the entire contents of which are hereby incorporated by reference.

BACKGROUND OF THE INVENTION

1. Field of the Invention

The present invention relates to a three-phase inverter.

2. Description of the Related Art

FIG. 10 is a diagram illustrating a main circuit configuration of a three-phase two-level full-bridge inverter (hereinafter, referred to as an inverter) that drives a load M such as an induction motor.

In FIG. 10, $S_{up}$, $S_{un}$, $S_{vp}$, $S_{vn}$, $S_{wp}$, and $S_{wn}$ are semiconductor switching elements such as IGBTs (insulated gate bipolar transistors), M is a load, $C_{DC}$ is a capacitor connected to the DC part of the inverter, $E_{DC}$ is a DC input voltage of the inverter, $i_{DCin}$ is a DC bus current, $i_u$, $i_v$, and $i_w$ are AC output currents of the respective phases, and $v_{uv}$, $v_{vw}$, and $v_{wu}$ are the respective line voltages.

FIG. 11 indicates voltage vectors (instantaneous space vectors) that are output by the inverter, switching patterns ($S_u$, $S_v$, $S_w$) of the U phase, V phase, and W phase, and $i_{DCin}$ corresponding to the respective voltage vectors. In a switching pattern ($S_u$, $S_v$, $S_w$), "1" indicates a state in which the switching element of the upper arm is on and "0" is a state in which the switching element of the lower arm is on. For example, (1, 0, 0) indicates a state in which the switching element $S_{up}$ of the upper arm of the U phase is on and the switching elements $S_{vn}$ and $S_{wn}$ of the lower arms of the V phase and W phase are on.

As is apparent from FIG. 11, the instantaneous value of the DC bus current $i_{DCin}$ is in accordance with the voltage vector, that is, in accordance with the switching pattern, is equal to one of the output currents of the respective phases of the inverter and its polarity is uniquely determined. For example, for the voltage vector $V_1$, because the switching pattern is (1, 0, 0) and the switching elements $S_{up}$, $S_{vn}$, and $S_{wn}$ are turned on, $i_{DCin}$ is equal to $+i_u$.

Next, an operation in a case in which the inverter generates three-phase AC voltages and supplies three-phase AC currents to a load M will be described.

FIG. 12A is a waveform diagram illustrating output voltages $v_u$, $v_v$ and $v_w$ and currents $i_u$, $i_v$ and $i_w$ of the respective phases of the inverter. Here, the voltages and the currents are three-phase sine waves, the voltage amplitude (corresponding to modulation rate)=0.7 [pu], the current amplitude=0.5 [pu], and the power factor=1. Note that "pu" is an abbreviation of "per unit" and represents a ratio with respect to a reference value (such as a maximum value, for example).

In general, a three-phase inverter repeats a similar operation by switching the switching elements of phases and upper and lower arms for every AC phase angle of 60°. Therefore, by defining the operation in a period of 60°, the operation in the entire period can be defined. Here, an example of a period in which the voltage phase angle θ=60° to 120° where the U phase voltage $v_u$ takes the maximum value among the three phases will be described. Note that ripple components of voltages and currents due to switching are neglected. FIG. 12B illustrates a switching pattern ($S_u$, $S_v$, $S_w$) obtained by comparing, with a carrier (triangle wave), voltage command values corresponding to the respective phase output voltages $v_u$, $v_v$, and $v_w$ of the vertical line portions where the voltage phase angle θ=80° in FIG. 12A. Also, FIG. 12B illustrates voltage vectors corresponding to this pattern, the DC bus current $i_{DCin}$, and its average value $i_{DCave}$.

Here, the switching pattern ($S_u$, $S_v$, $S_w$) is output voltage pulses for controlling output voltages of the respective phases to be predetermined values. That is, the switching pattern ($S_u$, $S_v$, $S_w$) is PWM pulses of the respective phases. Therefore, in the following description, the symbols $S_u$, $S_v$, and $S_w$ are also used as PWM pulses (or simply pulses) of the respective phases. The high level portions of the pulses $S_u$, $S_v$, and $S_w$ in FIG. 12B correspond to "1" of the switching pattern and indicate that the switching elements of the upper arms are in the on state. Hereinafter, the high level portions are referred to as positive side pulses for convenience. Also, the low level portions of the pulses $S_u$, $S_v$, and $S_w$ in FIG. 12B correspond to "0" of the switching pattern and indicate that the switching elements of the lower arms are in the on state. Hereinafter, the low level portions are referred to as negative side pulses for convenience.

FIG. 12B illustrates one cycle of the carrier (its cycle is referred to as $T_s$), and it is assumed that the voltage command values are constant during this cycle $T_s$. As can be seen from this diagram, $i_{DCin}$ takes a value equal to one of the alternating currents of the three phases and is a current which changes in a staircase waveform. Note that FIG. 13 is a waveform diagram illustrating the DC bus current $i_{DCin}$ in FIG. 12B and the average value $i_{DCave}$ thereof. In FIG. 12B, by transitioning the voltage vector from $V_0 \to V_1 \to V_6 \to V_7 \to V_6 \to V_1 \to V_0$ within the carrier cycle (switching cycle) $T_s$, the positive side pulse widths with respect to the switching elements $S_{up}$, $S_{vp}$, and $S_{wp}$ of the upper arms of the respective phases become $t_{su}$, $t_{sv}$, and $t_{sw}$, and their pulse widths become on periods of the respective switching elements $S_{up}$, $S_{vp}$, and $S_{wp}$.

The capacitor $C_{DC}$ provided in the DC portion of the inverter serves to output a high-frequency component (ripple component) included in $i_{DCin}$. In general, a carrier frequency in PWM control of an inverter is between several kHz to several tens kHz, depending on the specification, the carrier frequency is several hundred kHz. Therefore, $i_{DCin}$ contains a high-frequency component greater than or equal to the frequency. In order to supply this high-frequency component with good responsiveness, a capacitor that is connected close to a switching element of a main circuit is required.

On the other hand, as the high-frequency component of $i_{DCin}$ flows, the capacitor generates loss, and this loss increases the temperature of the capacitor. Because the lifetime of a capacitor is shortened as the temperature rises, in order to suppress the temperature rise, it is necessary to take measures such as using a capacitor having a large size (large capacity) or enhancing the capability of a cooling device for the capacitor. Such measures are causes of an increase in size and cost of the entire device.

In view of the above, for example, Non-Patent Document 1 discloses a technique of suppressing a high-frequency component contained in a DC current of a three-phase inverter, that is, of suppressing a high-frequency current flowing in a capacitor, by switching between a prior conventional space vector control method and another space vector control method for selecting a space vector such that an overlap of output line voltage pulses is minimized, in accordance with fluctuation of a load power factor.

RELATED-ART DOCUMENT

Non-Patent Document

[Non-Patent Document 1] Nishizawa et al., "Space Vector Modulation to Reduce Input Current Harmonics of two-level VSI Corresponding to the Power Factor Change", Institute of Electrical Engineers of Japan, Hokkaido Branch, SPC-15-133, Aug. 28, 2015

The control method described in Non-Patent Document 1 is based on a two-phase modulation, and in this two-phase modulation, a current continues to flow through a switching element that is fixed in an ON state over a plurality of periods. Therefore, depending on the conditions such as an output frequency of an inverter, the following problems occur: 1) a specific switching element overheats; 2) the number of switching times is reduced as compared with a three-phase modulation, and the noise increases; and 3) because the voltage command values of the respective phases suddenly change at the time of executing a two-phase modulation, electrical disturbance or shock is caused.

Therefore, an object of the present invention is to reduce a high-frequency component included in a bus current of a three-phase inverter to suppress a temperature rise of a capacitor and to prevent an entire device including a cooling device from becoming larger in size and higher in cost, by shifting PWM pulses according to a predetermined rule and adjusting the generation timings thereof without causing various problems of Non-Patent Document 1.

SUMMARY OF THE INVENTION

In view of the above, according to an embodiment of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein the three-phase inverter generates PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse.

According to an embodiment of the present invention, by shifting PWM pulses for driving semiconductor switching elements of a three-phase inverter according to a predetermined rule and adjusting the generation timings thereof, it is possible to reduce a high-frequency component included in a bus current to suppress a temperature rise of a capacitor. This contributes to reduce the cooling capacity of a device and to prevent an entire device from becoming larger in size and higher in cost.

BRIEF DESCRIPTION OF THE DRAWINGS

FIG. 11 is a diagram illustrating a relationship between output voltages, switching patterns, and DC bus currents of an inverter;

DETAILED DESCRIPTION OF THE EMBODIMENTS

Figure 1:
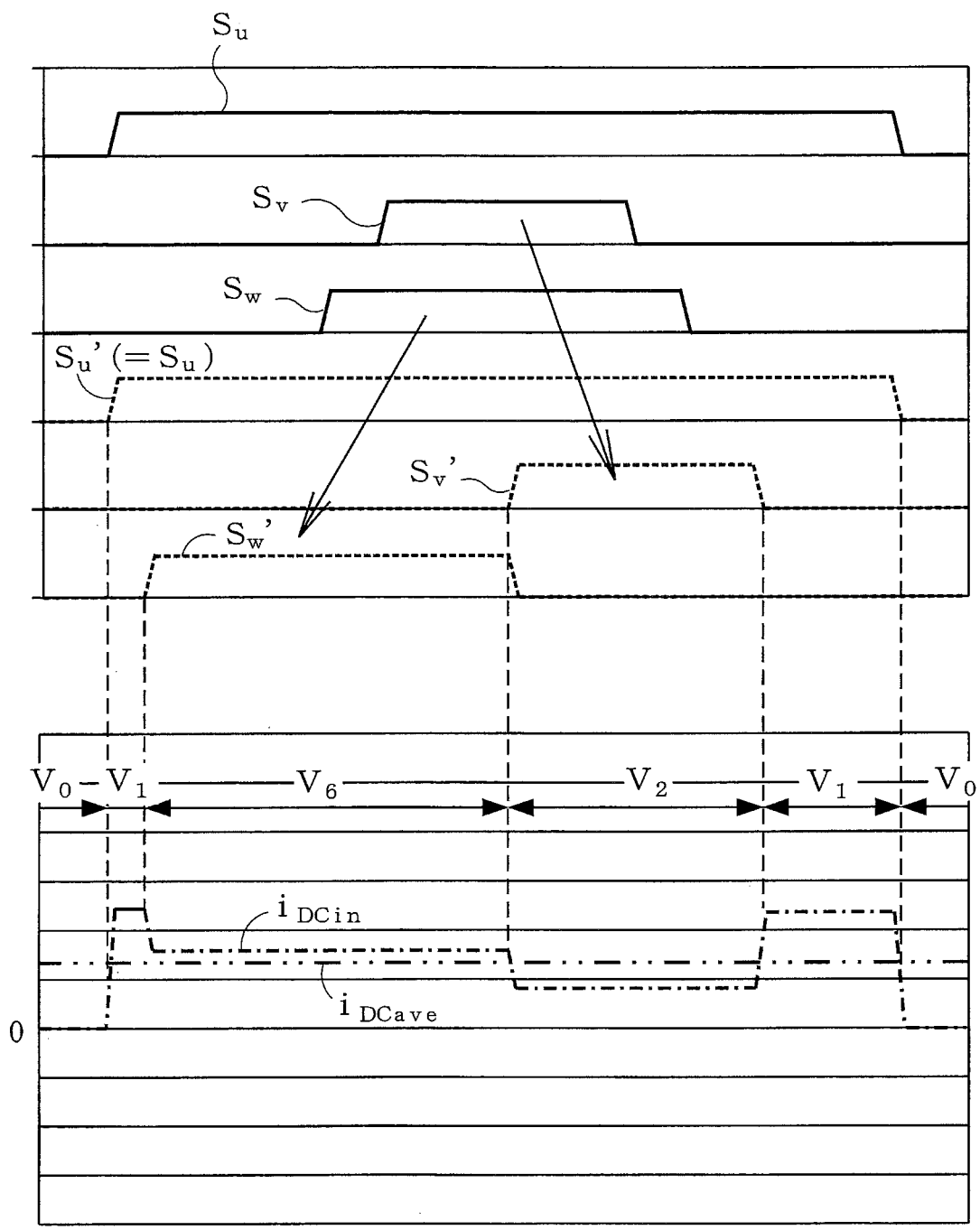
FIG. 1 is a waveform diagram illustrating a method of generating PWM pulses, a DC bus current, and an average value thereof according to an embodiment of the present invention.

Before describing an embodiment, aspects of the present invention will be described.

According to a first aspect of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein the three-phase inverter generates PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse.

According to a second aspect of the invention, in the three-phase inverter according to the first aspect, the positive side pulse of the phase, whose pulse width is the largest, encompasses the positive side pulses of the other two phases.

According to a third aspect of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein the three-phase inverter generates PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse.

According to a fourth aspect of the invention, in the three-phase inverter according to the third aspect, the negative side pulse of the phase, whose pulse width is the largest, encompasses the negative side pulses of the other two phases.

According to a fifth aspect of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein a first control mode and a second control mode are switchable, wherein the first control mode uses either PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is in a state in which a positive side pulse of one phase encompasses a positive side pulse of the other pulse; or PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is in a state in which a negative side pulse of one phase encompasses a negative side pulse of the other pulse, and wherein the second control mode executes one of the following modes: a mode of using PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse; a mode of using PWM pulses of three phases in which the positive side pulse of the phase, whose pulse width is the largest, encompasses the positive side pulses of the other two phases; a mode of using PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse; and a mode of using PWM pulses of three phases in which the negative side pulse of the phase, whose pulse width is the largest, encompasses the negative side pulses of the other two phases.

According to a sixth aspect of the invention, in the three-phase inverter according to the fifth aspect, the first control mode and the second control mode are switched in accordance with polarities or a magnitude relationship of voltages and currents output by the three-phase inverter.

According to a seventh aspect of the invention, in the three-phase inverter according to the first aspect, in the three-phase inverter according to the first aspect, wherein three-phase inverter compares voltage command values of the respective phases with a triangle wave that is a carrier to generate PWM pulses of the three phases, wherein the voltage command values of the respective phases are voltage command values such that output voltages in a predetermined period within one cycle of the triangle wave are equal to or greater than time-averaged values of target voltages to be output within the one cycle, and output voltages in a remaining period within the one cycle are less than the time-averaged values of the target voltages, and wherein the voltage command values of the respective phases within the one cycle are equal to the time-averaged values of the respective target voltages.

According to an eighth aspect of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein a first mode and a second mode are switchable, wherein the first mode uses either PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse; or PWM pulses of three phases in which the positive side pulse of the phase, whose pulse width is the largest, encompasses the positive side pulses of the other two phases; wherein the second mode uses either PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse; or PWM pulses of three phases in which the negative side pulse of the phase, whose pulse width is the largest, encompasses the negative side pulses of the other two phases, and wherein, when switching the first mode and the second mode, a generation timing of a PWM pulse of a phase whose positive side pulse width is the smallest is changed before and after the switching.

According to a ninth aspect of the invention, a three-phase inverter includes three series circuits that are connected in parallel to a capacitor connected in parallel to a DC voltage source, wherein each of the three series circuits includes two semiconductor switching elements that are connected in series, wherein a connection point between the two semiconductor switching elements is used as an AC output terminal for each phase, wherein the three-phase inverter controls, for each predetermined switching cycle, the semiconductor switching elements based on PWM pulses for respective phases, wherein a first mode and a second mode are switchable, wherein the first mode uses either PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse; or PWM pulses of three phases in which the positive side pulse of the phase, whose pulse width is the largest, encompasses the positive side pulses of the other two phases; wherein the second mode uses either PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse; or PWM pulses of three phases in which the negative side pulse of the phase, whose pulse width is the largest, encompasses the negative side pulses of the other two phases, and wherein, when switching the first mode and the second mode, a generation timing of a PWM pulse of a phase whose positive side pulse width is between the largest and the smallest is changed before and after the switching.

Figure 10:
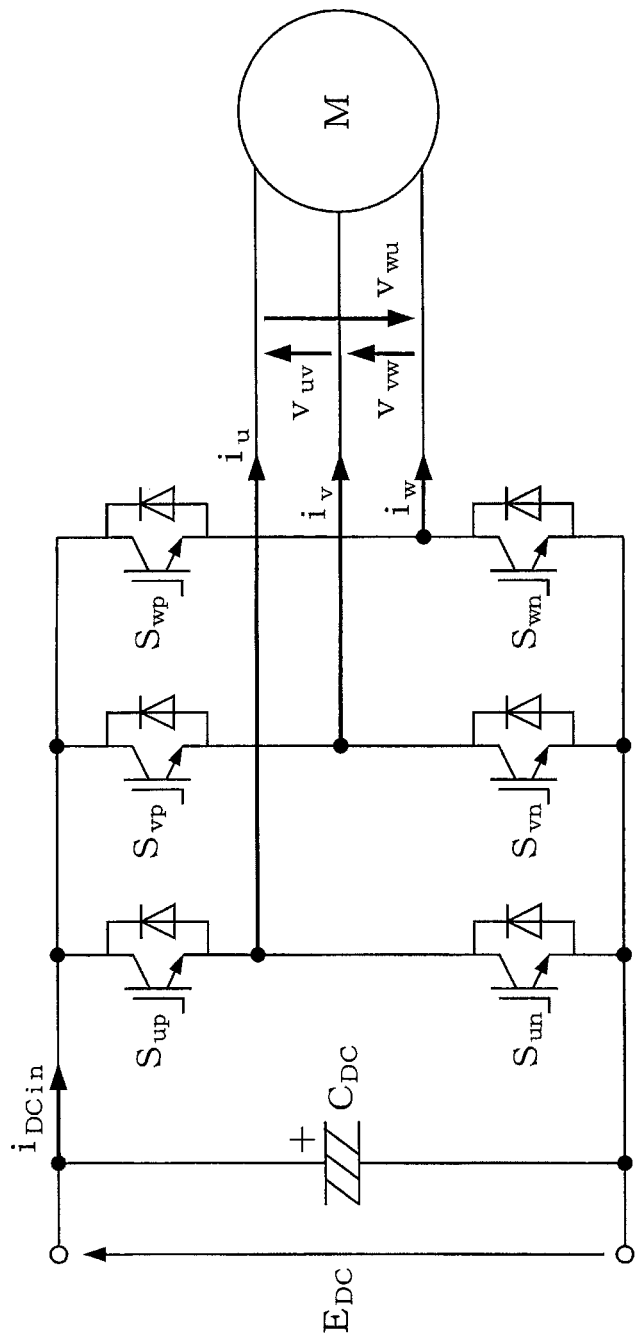
FIG. 10 is a diagram illustrating a main circuit configuration of a three-phase two-level full-bridge inverter.

In the following, an embodiment of the present invention will be described with reference to the drawings. Note that this embodiment relates to a three-phase inverter having a capacitor $C_{DC}$ in a DC portion as illustrated in FIGS. 10A and 10B.

Figure 12A:
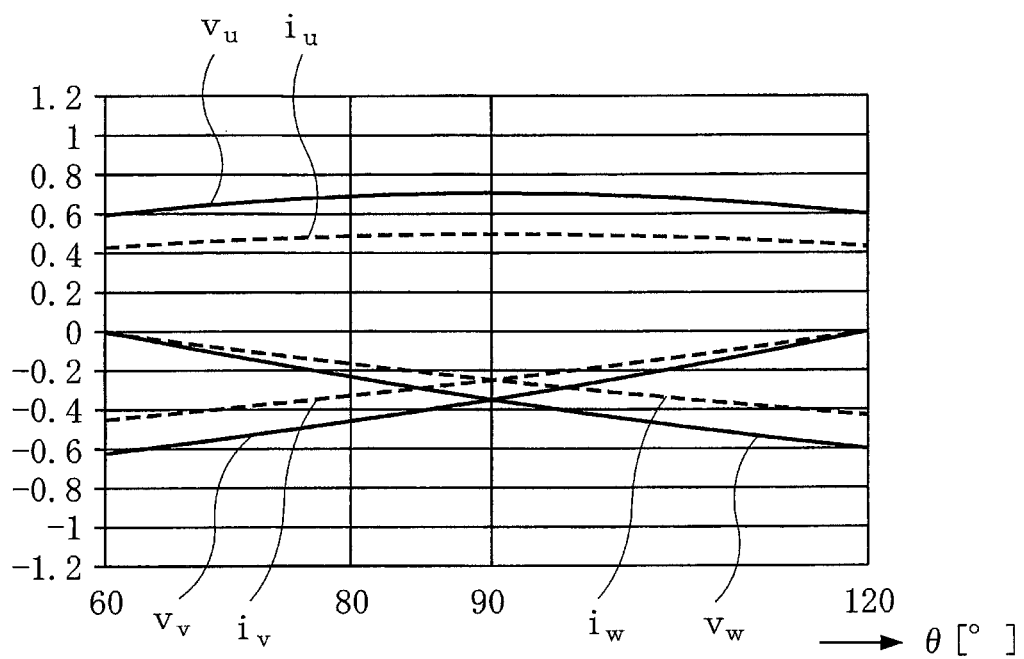
FIG. 12A is a waveform diagram illustrating output voltages and currents of the respective phases of an inverter.
Figure 12B:
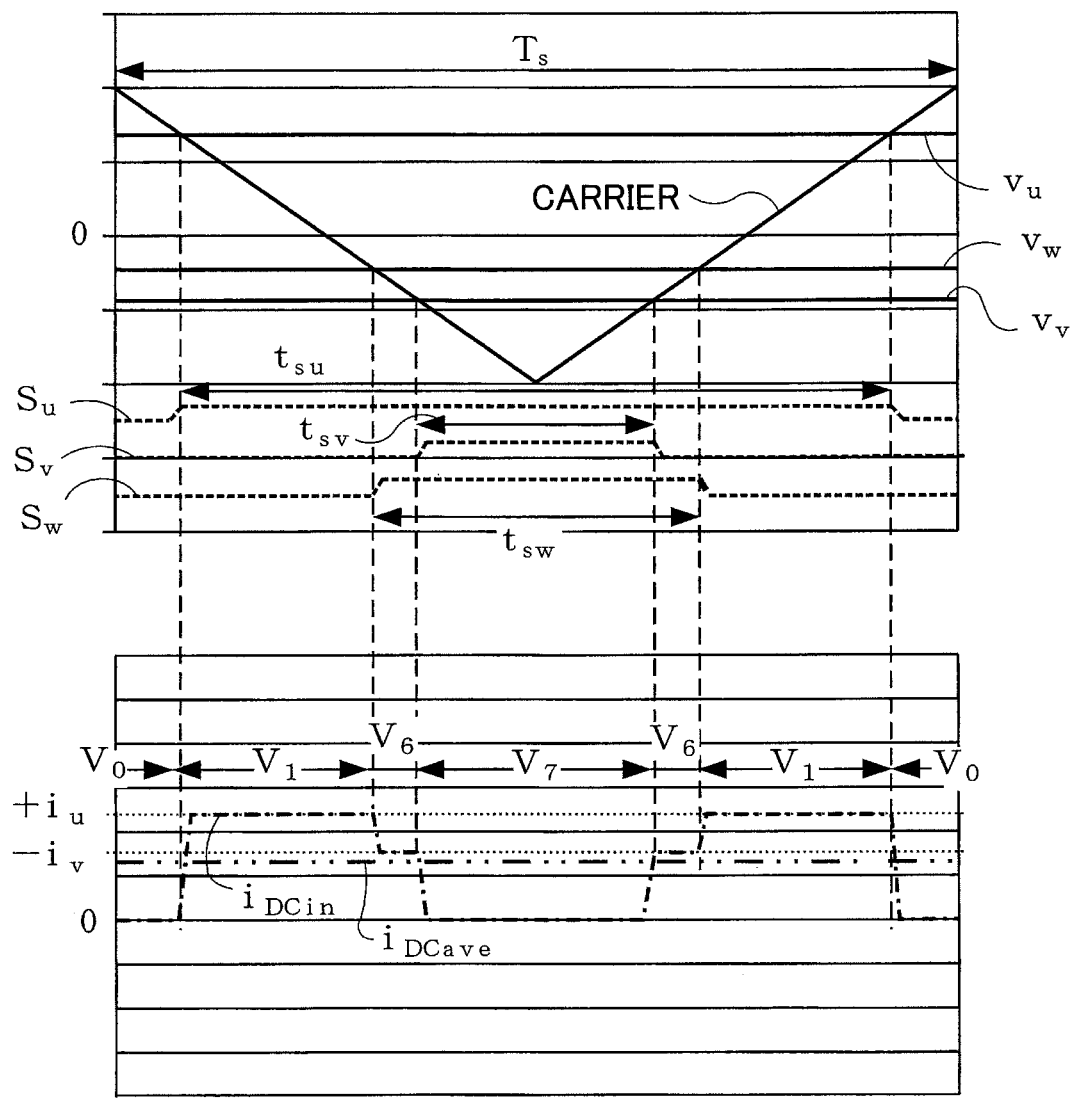
FIG. 12B is a waveform diagram illustrating a switching pattern (PWM pulses), a DC bus current, and an average value of the DC bus current in PWM pulse control.
Figure 13:
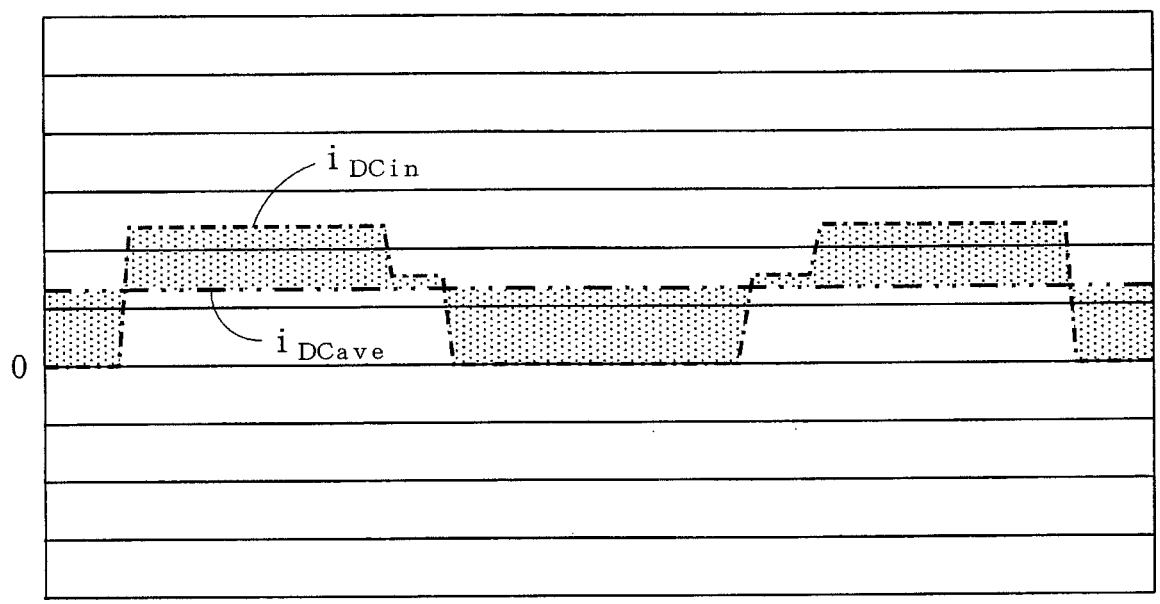
FIG. 13 is a waveform diagram illustrating a DC bus current and the average value of the DC bus current of the inverter.

As described above, an object in one aspect of the present invention is to adjust the generation timings of PWM pulses as appropriate so as to reduce the high-frequency component of the DC bus current $i_{DCin}$ illustrated in FIG. 12B and FIG. 13. Therefore, when the DC bus current $i_{DCin}$ is quantified using its root mean square value, the formulas 1 to 3 are established.

$$i_{DCinRMS}(T_s) = \sqrt{\frac{1}{T_s}\int_0^{T_s} i_{DCin}^2 dt} \qquad \text{[Formula 1]}$$

$$i_{DCave} = \frac{3}{4} m \cdot I_m \cos\phi \qquad \text{[Formula 2]}$$

$$i_{CRMS}(T_s) = \sqrt{i_{DCinRMS}^2(T_s) - i_{DCave}^2} \qquad \text{[Formula 3]}$$

The variables in the formulas 1 to 3 are defined as follows.
$T_s$: cycle of carrier used for PWM control
$i_{DCinRMS}(T_s)$: root mean square value (including DC component) within cycle $T_s$ of $i_{DCin}$
$i_{DCave}$: average value of $i_{DCin}$ (=DC component)
m: modulation factor
$I_m$: amplitude of AC output current
cos φ: power factor
$i_{CRMS}$: root mean square value within cycle $T_s$ of high-frequency current (ripple current) flowing through capacitor $C_{DC}$ The root mean square value $i_{CRMS}$ indicated in the formula 3 corresponds to the areas of the portions (shaded portions in FIG. 13) that are surrounded by $i_{DCave}$ and by the waveform of $i_{DCin}$ alternating with reference to $i_{DCave}$. Therefore, in the following description, a technique for reducing the areas of the shaded portions will be described.

FIG. 1 is a diagram for explaining an embodiment corresponding to the first to fourth aspects. FIG. 1 illustrates pulses $S_u'$ (=$S_u$), $S_v'$, and $S_w'$ of respective phases in a case of being sifted in the time axis direction with reference to the center positions of the pulse widths of all the three phases such that the positive side pulses of $S_v$ and $S_w$ fit in the positive side pulse of $S_u$, while maintaining the pulse widths $S_v$ and $S_w$ within the width pulse of $S_u$ that is the largest width among $S_u$, $S_v$, and $S_w$ of normal PWM pulses (pulses in FIG. 12B) in which the center positions of the pulse widths of all the three phases are aligned by a carrier (triangle wave) comparison system within the carrier cycle $T_s$. As described above, because the pulse widths of the respective phases within the cycle $T_s$ do not change before and after shifting the pulses, the average value of output voltages of the respective phases in the cycle $T_s$ is maintained due to the principle of PWM control.

In this case, in order to obtain the pulses $S_u'$ (=$S_u$), $S_v'$, $S_w'$, the voltage vector may be made to transition from $V_0 \rightarrow V_1 \rightarrow V_6 \rightarrow V_2 \rightarrow V_1 \rightarrow V_0$ within the cycle $T_s$ such that the switching elements of the respective phases are controlled. According to FIG. 11, among the above described voltage vectors, $V_1$ is a vector that causes $i_u$ to flow, $V_2$ is a vector that causes $-i_w$ to flow, and $V_6$ is a vector that causes $-i_v$ to flow. When the switching elements are controlled by transitioning the voltage vectors including $V_1$, $V_2$, and $V_6$ as described above, it is possible to adjust the generation timings by shifting the pulses $S_v$ and $S_w$ to $S_v'$ and $S_w'$ respectively. As a result, the DC bus current $i_{DCin}$ can be reduced relative to $i_{DCin}$ in FIG. 12B and FIG. 13, and the root mean square value $i_{CRMS}$ of the high-frequency current of the capacitor $C_{DC}$ can be reduced. That is, by shifting the pulses of the predetermined phases while maintaining the pulse widths of the PWM pulses within the cycle $T_s$, it is possible to reduce the high-frequency current flowing through the capacitor $C_{DC}$ and to suppress heat generation.

Note that in the embodiment illustrated in FIG. 1, because the positive side pulse width of $S_u$ is large, the pulses $S_v'$ and $S_w'$ can be obtained by shifting $S_v$ and $S_w$ in the time axis direction so as not to overlap with each other within the pulse width of $S_u$. However, when the positive side pulse width of $S_u$ is small, there may be a case in which it is impossible to shift $S_v$ and $S_w$ so as not to overlap with each other within the pulse width. However, even in such a case, it is possible to reduce $i_{DCin}$ and furthermore $i_{CRMS}$ by the following method.

Figure 2A:
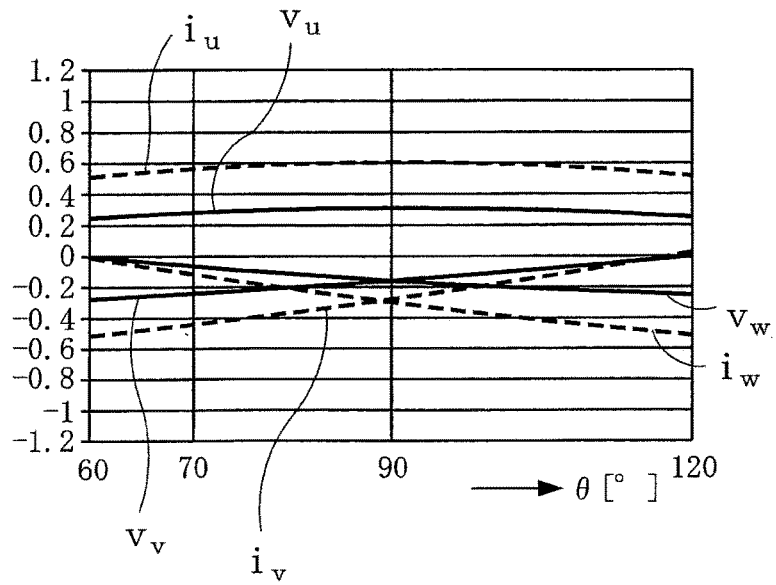
FIGS. 2A to 2C are waveform diagrams illustrating a method of generating PWM pulses, a DC bus current, and an average value thereof according to the embodiment of the present invention.

FIG. 2A is a waveform diagram illustrating output voltages $v_u$, $v_v$, and $v_w$ and currents $i_u$, $i_v$, and $i_w$ of each phase of the inverter. Here, the voltages and the currents are three-phase sine waves, the voltage amplitude=0.3 [pu], the current amplitude=0.6 [pu], and the power factor=1.

Figure 2B:
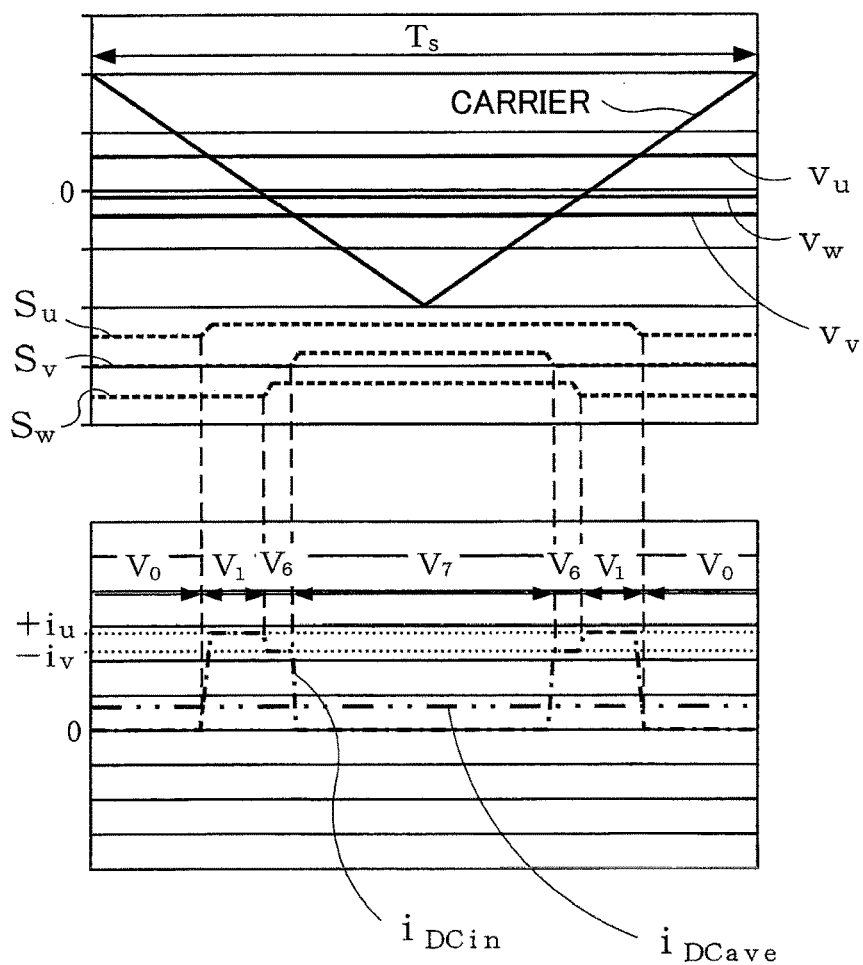

FIG. 2B illustrates, for a case in which voltage command values corresponding to the respective phase output voltages $v_u$, $v_v$, and $V_w$ of the vertical line portion where the voltage phase angle θ is 70° in FIG. 2A are compared with the carrier, the switching pattern ($S_u$, $S_v$, $S_w$), the voltage vectors, the DC bus current $i_{DCin}$, and the average value $i_{DCave}$ thereof.

In a case where the voltage amplitude is small as illustrated in FIG. 2A, in PWM control of a usual carrier comparison system, as illustrated in FIG. 2B, pulses $S_u$, $S_v$, and $S_w$ are generated that are smaller in differences between the pulse widths than those of FIG. 12B.

Figure 2C:
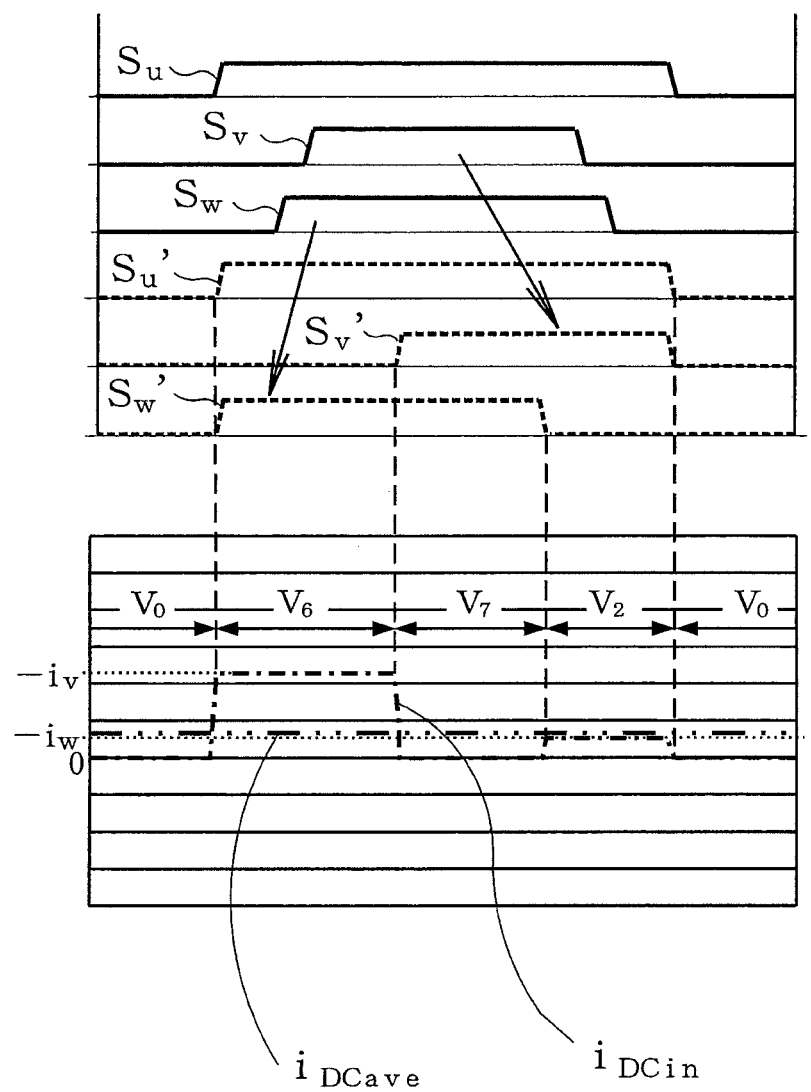

In such a case, as illustrated in FIG. 2C, in order to fit the positive side pulses of $S_v$ and $S_w$ in the positive side pulse width of $S_u$, a voltage vector for obtaining pulses $S_u'$ and $S_w'$ respectively shifted along the time axis is selected to transition from $V_0 \to V_6 \to V_7 \to V_2 \to V_0$. This makes it possible to reduce the amplitude of the $i_{DCin}$ and reduce the root mean square value $i_{CRMS}$ of the high-frequency current corresponding to the areas of the portions surrounded by $i_{DCin}$ and $i_{DCave}$ Next, an appropriate adjustment method of PWM pulse in consideration of a power factor will be described. Here, a case in which losses of the inverter are ignored the output power is positive (during the power running operation of driving a load M) will be described. In this case, the average value $i_{DCave}$ of the DC bus current $i_{DCin}$ is positive. As will be described later below, a case in which the output power of the inverter is negative (during the regenerative operation from the load M), that is, a case in which $i_{DCave}$ is negative can be considered similarly to a case in which the output power is positive by sign inversion.

In the following, similarly to the above, a period in which the voltage phase angle θ is between 60° and 120° and in which the U phase voltage $v_u$ is the largest among the respective phases will be discussed.

When $i_{DCave}$ is positive, in order to reduce the high-frequency current $i_{CRMS}$ flowing in the capacitor $C_{DC}$, voltage vectors may be selected such that, among the eight kinds of currents indicated in the right end column of FIG. 11, $i_{DCin}$ is constituted only by values close to $i_{DCave}$. In other words, it may be sufficient to avoid outputting voltage vectors that cause a current with a large difference from $i_{DCave}$ to flow. However, in order to maintain the output voltage of the inverter according to a command value, it is required to maintain the pulse widths of respective phase voltages. Therefore, as an adjustment method, it is considered to shift the generation timings of pulses of the respective phase voltages back and forth along the time axis direction. In the following, a specific method with respect to the above will be described below.

As described for FIG. 12B, the on periods of the switching elements $S_{up}$, $S_{vp}$, and $S_{wp}$ of the upper arms of the respective phases are defined as $t_{su}$, $t_{sv}$, and $t_{sw}$ respectively. These periods take values ranging from 0 to $T_s$. As can be seen from FIG. 12A, while $v_u$ is the largest in the period in which the voltage phase angle θ is between 60° and 120°, $v_v$ is the smallest between θ=60° to 90°, and $v_w$ is the smallest between 90° and 120°. Therefore, the following modes in accordance with the respective periods are provided (hereinafter, referred to as shift operation modes).

(1) In the entire range between 60° to 120°, $t_{su}$ is longer than $t_{sv}$ and $t_{sw}$.
(2) Between 60° and 90°, $t_{sv}$ is shorter than $t_{su}$ and $t_{sw}$.
(3) Between 90° and 120°, $t_{sv}$ is shorter than $t_{su}$ and $t_{sv}$.

Therefore, when shifting the pulses, in the shift operation mode (1), the U phase positive side pulse can fit (encompasses), within its pulse width, the positive side pulses of the other two phases. In the shift operation modes (2) and (3), the negative side pulse widths of the V phase and the W phase can encompass the negative side pulses of the other two phases, respectively.

Here, with respect to encompassing of the negative side pulses, in a case of using a triangle wave that drops in the first half and rises in the second half in one cycle similarly to the carrier illustrated in FIG. 12B, while the positive side pulses are continuously present as in the periods $t_{su}$, $t_{sv}$, and $t_{sw}$, the negative side pulses are split back and forth in principle. Therefore, when a pulse of another phase is during a period in which a negative side pulse split back and forth as described above is 0, it is referred to as "encompass".

In the above described shift operation modes (1), (2), and (3), when it is possible to encompass, within the pulse width of one phase, pulses of the other two phases, Table 1 is obtained by associating voltage vectors that can be output except $V_0$ and $V_7$ with values of DC bus current $i_{DCin}$ at the time of switching according to each voltage vector. In this table 1, the correspondence relationship between the voltage vectors $V_1$ to $V_6$ and $i_{DCin}$ illustrated in FIG. 11 corresponds to the shift operation modes (1), (2) and (3). Hereinafter, the correspondence relationship illustrated in Table 1 is referred to as "condition 1".

TABLE 1

| (1) | $V_1$ (1, 0, 0) | $V_2$ (1, 1, 0) | $V_6$ (1, 0, 1) | * $S_u$ IS VOLTAGE VECTOR OF 1 |
|---|---|---|---|---|
| | $i_u$ | $-i_w$ | $-i_v$ | |
| (2) | $V_1$ (1, 0, 0) | $V_5$ (0, 0, 1) | $V_6$ (1, 0, 1) | * $S_v$ IS VOLTAGE VECTOR OF 0 |
| | $i_u$ | $i_w$ | $-i_v$ | |
| (3) | $V_1$ (1, 0, 0) | $V_2$ (1, 1, 0) | $V_3$ (0, 1, 0) | * $S_w$ IS VOLTAGE VECTOR OF 0 |
| | $i_u$ | $-i_w$ | $i_v$ | |

On the other hand, the magnitude relationship between the respective phase currents $i_u$, $i_v$, and $i_w$ in the period in which the voltage phase angle θ is between 60° and 120° changes depending on the power factor.

As described above, in the power running state, $i_{DCave}$ is positive. Note that the power running state means that the power factor angle φ is in a range of −90° to 90°. For the power factor of positive and negative, the magnitude relationship of voltages and currents can be considered similarly. Therefore, a case will be described in which the power factor angle φ is in a range of −90° to 0°.

In the power running state, $i_{CRMS}$ can be reduced by outputting, as $i_{DCin}$, a positive value much. In other words, if a negative value is output as $i_{DCin}$, $i_{CRMS}$ would increase, so this should be avoided. As described above, in the power running state, outputting, as $i_{DCin}$, a positive value as much as possible so as to reduce $i_{CRMS}$ is referred to as "condition 2".

In consideration of the above described "condition 1" and "condition 2", the shift operation modes of Table 1 to be selected in accordance with power factor angles φ and voltage phase angles θ can be summarized as illustrated in Table 2. Note that FIGS. 3A to 3G, indicated in the lower part of Table 2, will be described later below.

TABLE 2

|  |  | POWER FACTOR ANGLE φ | | | | | | |
|---|---|---|---|---|---|---|---|---|
|  |  | 0° | ~ | −30° | ~ | −60° | ~ | −90° |
| VOLTAGE | 60° | (1) | (2) | (2) | (2) | (2) | X | X |
| PHASE | ~ | (1) | (1)/(2) | (2) | (2) | (2) | X/(2) | X |
| ANGLE θ | 90° | (1) | (1) | (1) or (2) | (2) | (2) or X | (2) or X | X |
|  | ~ | (1) | (1) | (1) | X/(1) | X | X | X |
|  | 120° | (1) | (1) | (1) | X | X | X | X |
|  | FIG. 3 | A | B | C | D | E | F | G |

In Table 2, "~" with respect to the voltage phase angle θ means a value between above and below, and "~" with respect to the power factor angle φ means a value between left and right.

Also, in Table 2, "/" means that the shift operation mode is switched in accordance with the power factor angle φ in a middle of the voltage phase angle θ.

Also, in Table 2 "or" means a boundary between two shift operation modes.

Also, in Table 2, "x" means that none of the shift operation modes described in Table 1 can be selected.

FIGS. 3A to 3G illustrate the relationship between the shift operation modes in Table 1 and voltages and currents of the respective phases in accordance with the power factor angle φ in Table 2.

Figure 3A:
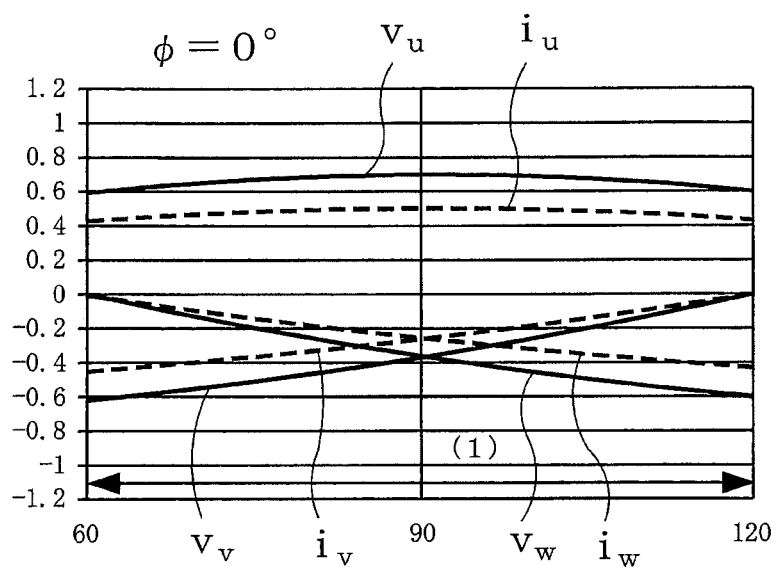
FIGS. 3A to 3G are diagrams illustrating a relationship between shift operation modes of Table 1 and voltages and currents of respective phases in accordance with power factor angles.

FIG. 3A illustrates a case where the power factor angle φ=0°, that is, the power factor is 1 as in FIG. 1 and FIGS. 2A to 2C, and the voltages and the currents are in-phase. In this case, because the polarity and the magnitude relationship of the voltages and the currents of the respective phases are the same over the entire range of the period in which the voltage phase angle θ is between 60° and 120°, the shift operation mode (1) of Table 1 according to the condition 1 may be selected.

Figure 3B:
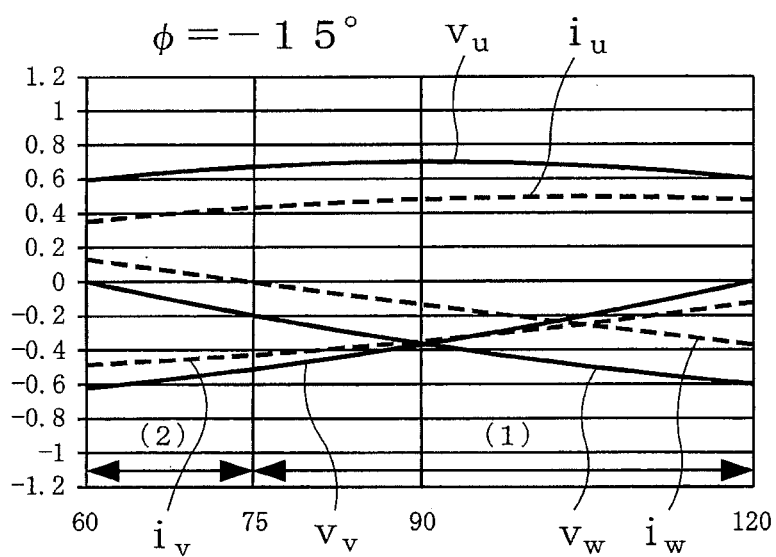

FIG. 3B illustrates a case where the power factor angle φ=−15°. In this case, while the polarity and the magnitude relationship of the voltages and the currents of the respective phases are the same in the period in which the voltage phase angle θ is between 75° and 120°, they are not satisfied in the period in which the voltage phase angle θ is between 60° and 75°. That is, in the period between 60° and 75°, only the V phase current is negative and the V phase voltage is the smallest. Therefore, in this case, it is possible to realize the shift operation mode (2) of Table 1 by shifting the pulses such that the negative side pulse width of the V phase encompasses the negative side pulses of the other two phases.

More specifically describing a case in which the power factor angle φ=−15°, in the shift operation mode (2), only $i_v$ among $i_u$, $i_v$, and $i_w$ includes the voltage vector $V_6$ whose polarity inverts. Therefore, when selecting three vectors $V_1$, $V_5$, and $V_6$ of the shift operation mode (2), $i_{DCin}$ always takes a positive value. This state is indicated by FIGS. 4A to 4C.

Figure 4A:
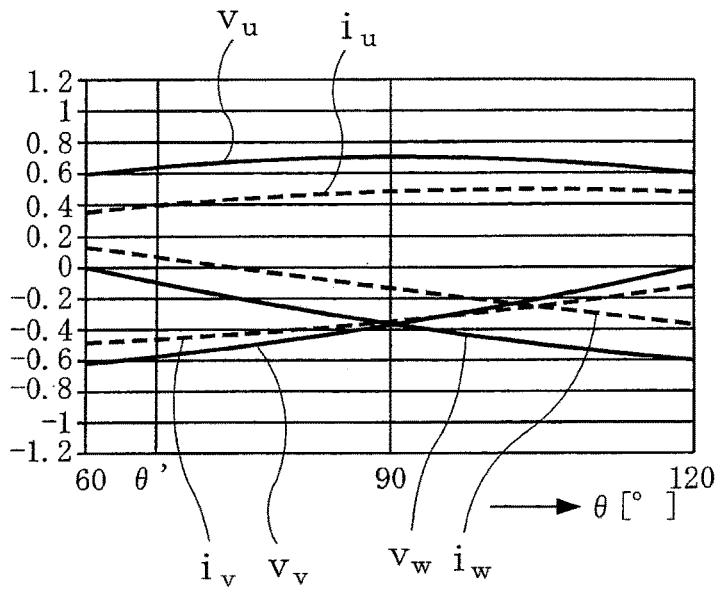
FIGS. 4A to 4C are waveform diagrams illustrating a method of generating PWM pulses at predetermined power factor angles in FIGS. 3A to 4G, a DC bus current, and its average value.
Figure 4B:
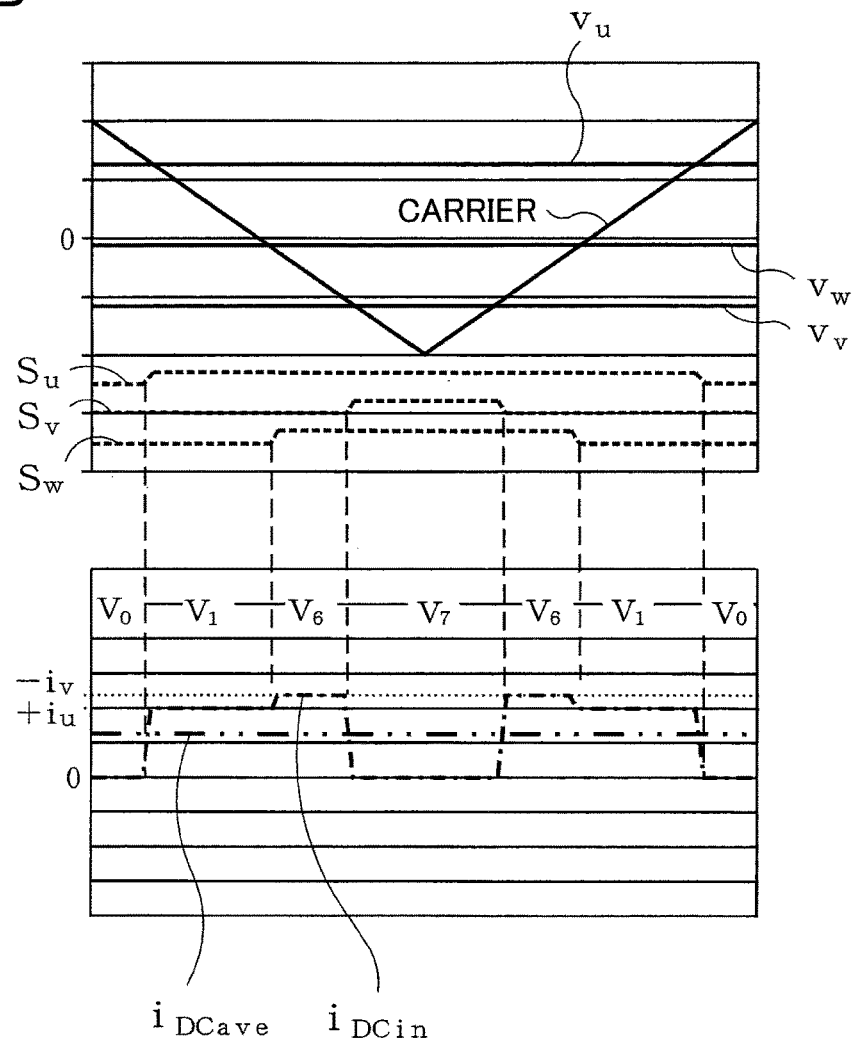

FIG. 4A is a diagram that is the same as FIG. 3B. Also, FIG. 4B illustrates PWM pulses according to a normal carrier comparison system obtained by comparing, with a carrier, voltage command values of the respective phases at the voltage phase angle θ' (value of 60° to) 90° in FIG. 4A (PWM pulses for which the center positions of the respective phase pulses are aligned). Also, FIG. 4B illustrates voltage vectors $i_{DCin}$, and $i_{DCave}$. FIG. 4C illustrates the pulses $S_u'$, $S_v'$, and $S_w'$ obtained by shifting the pulses $S_u$, $S_v$, and $S_w$ according to the present embodiment, the voltage vectors, $i_{DCin}$, and $i_{DCave}$.

Figure 4C:
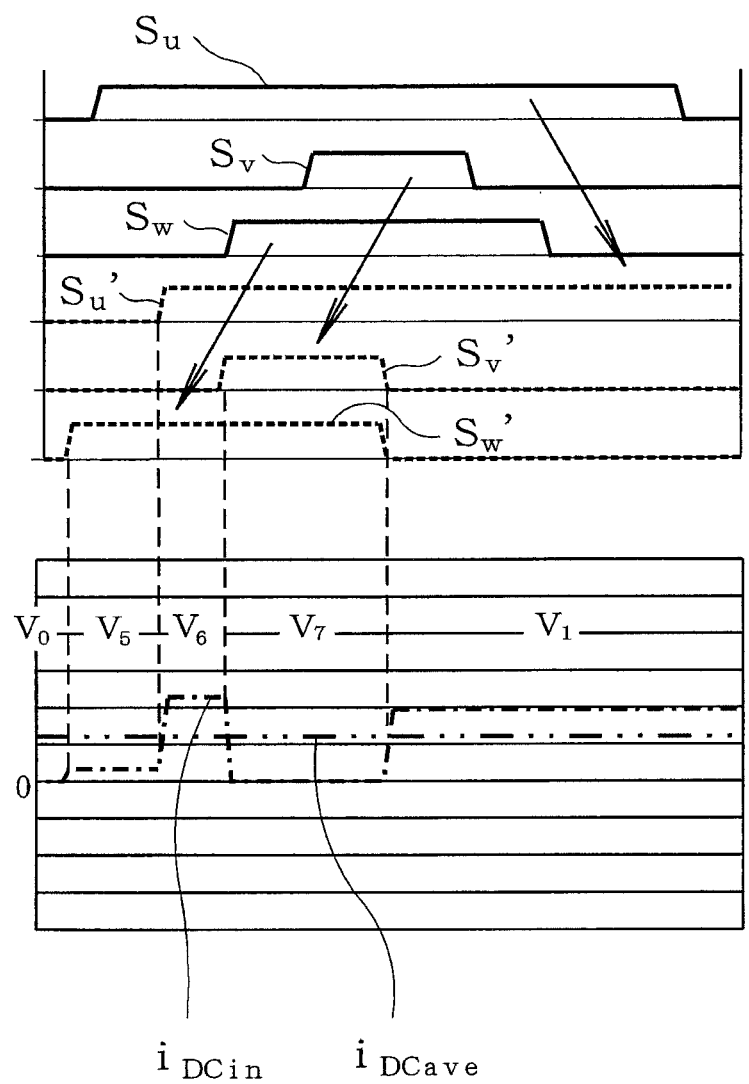

As seen in the encompassing relationship of the pulses $S_u'$, $S_v'$, and $S_w'$ illustrated in FIG. 4C, it is found that, in the width of the V phase negative side pulse $S_v'$, the negative side pulses $S_u'$ and $S_w'$ of the U phase and the W phase are encompassed, and the encompassing relationship according to the shift operation mode (2) described above is satisfied.

Returning back to FIGS. 3A to 3G, FIG. 3C corresponds to a case in which the power factor angle φ is −30°. As the patterns to be selected, the shift operation modes (1) and (2) in Table 1 are half and half.

Figure 3C:
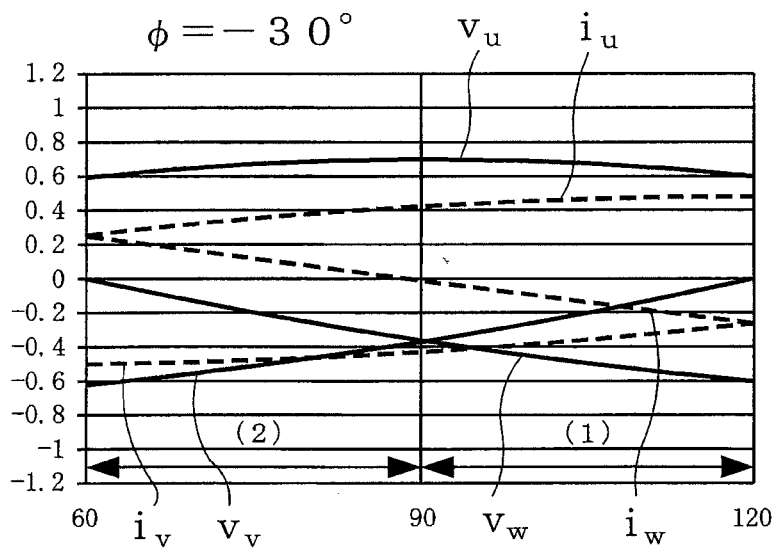
Figure 3D:
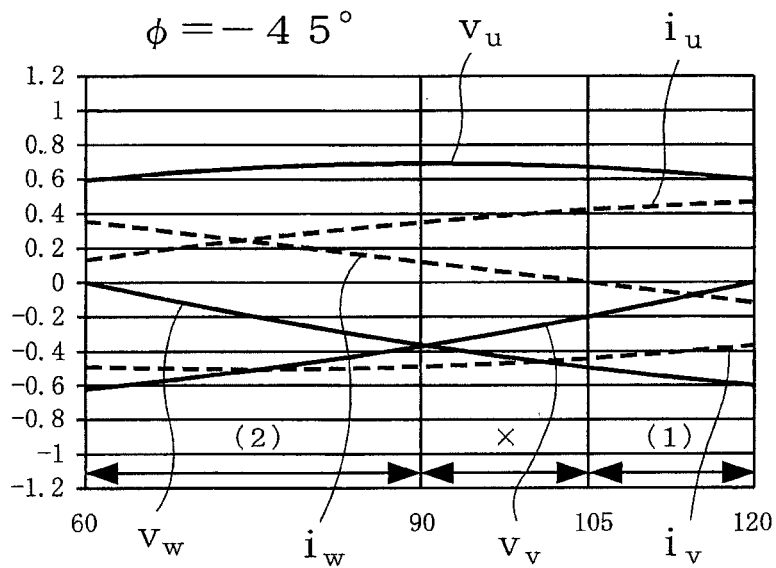

FIG. 3D indicates the case where the power factor angle φ is −45°. In this case, for the range of the voltage phase angle between 105° and 120°, as in the case of φ=0°, the shift operation mode (1) in Table 1 can be selected, and for the range of the voltage phase angle between 60° and 90°, as in the case of φ=−15°, the shift operation mode (2) in Table 1 can be selected. On the other hand, for the range between 90° to 105°, none of the modes in Table 1 according to the above described condition 1 can be selected. This is represented by "x" in Table 2.

More specifically, in the range in which the voltage phase angle is between 90° and 105°, because only the polarity of the current of the V phase differs from the other phases, and only the polarity of the U phase differs from the other phases with respect to the voltage, whichever of the shift operation modes (1) to (3) in Table 1 is selected, it is inevitable that $i_{DCin}$ takes a negative value.

Shifting the pulses in this situation may cause a large negative current to be included in a DC bus current $i_{DCin}$ even when $i_{DCave}$ is a positive value. Therefore, in this case, without performing an operation of shifting the pulses according to the present embodiment, the pulses may be controlled by PWM control mode according to a normal carrier comparison system in which positive side pulses of the three phases overlap in a large area and many zero vectors are output (control mode in which the center positions of positive side pulses or negative side pulses of the respective phases are aligned as illustrated in FIG. 4B).

As described above, the idea of switching between a control mode for performing a shift operation according to the embodiment of the present invention (second control mode) and a PWM control mode according to the normal carrier comparison system (first control mode) corresponds to the fifth aspect of the invention.

Figure 3E:
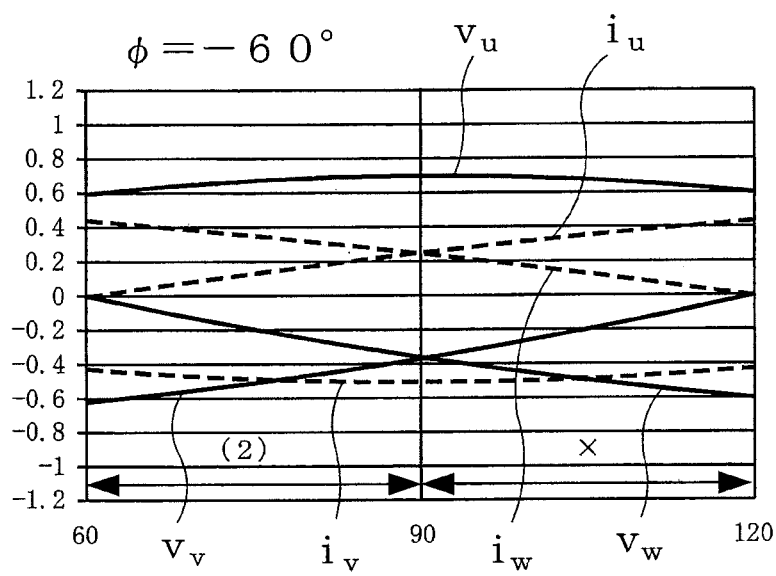
Figure 3F:
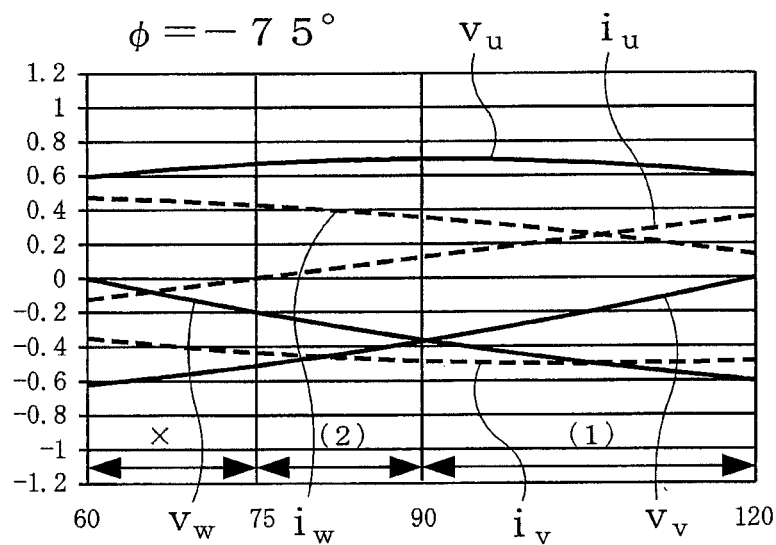
Figure 3G:
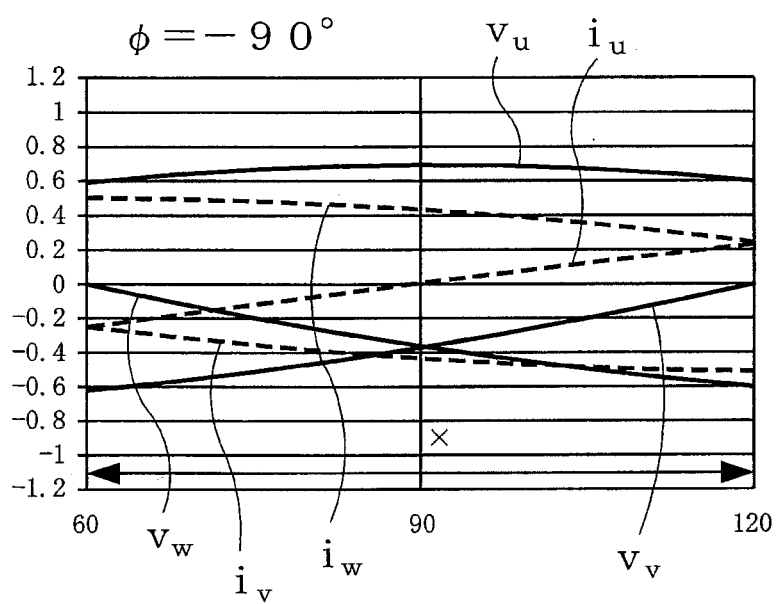

FIGS. 3E to 3G indicate cases in which the power factor angle φ is between −60° and −90°. The period of "x"

increases as the power factor angle increases, and the entire range is "x" at −90°. That is, as is clear from Table 2, as the power factor angle increases, a case according to the normal PWM control mode increases.

As described above, in accordance with polarities or a magnitude relationship of the voltages and the currents output by the inverter, switching the second control mode for shifting pulses and the first control mode according to the normal carrier comparison system corresponds to the sixth aspect of the invention. Specifically, an idea of switching two control modes in accordance with conditions such as polarities of voltages and currents, a phase angle, and a power factor corresponds to the sixth aspect of the invention.

As an analogy from Table 2, when the power factor angle φ is positive, the voltage vector may be selected by adopting the shift operation mode (3) instead of the shift operation mode (2) in Table 2.

Also, due to the symmetry of an operation for each 60° of the voltage phase angle in the three-phase inverter, the operation method of the PWM pulses in other ranges of the voltage phase angle θ can also be derived in a manner similarly to Table 2.

Further, in the regenerative state where the power factor angle φ is between 90° and 180° (−180° and) −90°, $i_{DCave}$ is negative. In this case, under a basic principle that $i_{CRMS}$ can be reduced when $i_{DCin}$ is output as a negative value as much as possible, it is possible to derive the operation method of the PWM pulses according to an idea similar to that in the power running state.

In summary, in a carrier cycle $T_s$, with respect to a specific phase whose polarity only differs among the three phase alternating currents, the voltage of the specific phase is compared with the voltages of the other phases. In a case where the voltage of the specific phase is the largest or the smallest, the switching elements are controlled by using the PWM pulses shifted along the time axis so that, in the pulse width of the PWM pulse of the specific phase, the PWM pulses of the other two phases are encompassed as much as possible. In a case where the voltage of the specific phase is neither the largest nor the smallest, the switching elements are controlled by using the PWM pulses of the three phases obtained by the normal carrier comparison system without performing the shift operation described above.

Here, the encompassing relationship between the pulse width of the PWM pulse of a phase as described above and the PWM pulses of the other two phases is not necessarily strict. For example, although the pulses $S_v'$ and $S_w'$ after being shifted are completely encompassed within the pulse width of the pulse $S_u'$ in FIG. 2C, even in a case where the pulse $S_w'$ somewhat protrudes from the left end of the pulse $S_u'$ or in a case where the pulse $S_v'$ somewhat protrudes from the right end of the pulse $S_u'$ (in other words, in a case where the pulse $S_v'$ or $S_w'$ is not strictly encompassed within the pulse width of the pulse $S_u'$), the effects of an embodiment of the present invention can be obtained.

Furthermore, the overlapping range on the time axis between the PWM pulses of other two phases encompassed within the pulse width of the PWM pulse of the phase as described above is not necessarily the shortest. The same applies to positive side pulses and negative side pulses of PWM pulses. For example, in FIG. 2C, even if the left end of the pulse $S_w'$ is located on the right side with some margin from the left end of the pulse $S_u'$ and the right end of the pulse $S_v'$ is located on the left side with some margin from the right end of the pulse $S_u'$ such that the overlapping range on the time axis of the pulses $S_v'$ and $S_w'$ is not the shortest, the effects of an embodiment of the present invention can be obtained. Note that the switching indicated by "/" in Table 2 is not required to be strictly performed, and even when there is a deviation in the voltage phase angle θ or the power factor angle φ at which switching is performed, $i_{CRMS}$ can be reduced as a whole.

Figure 9A:
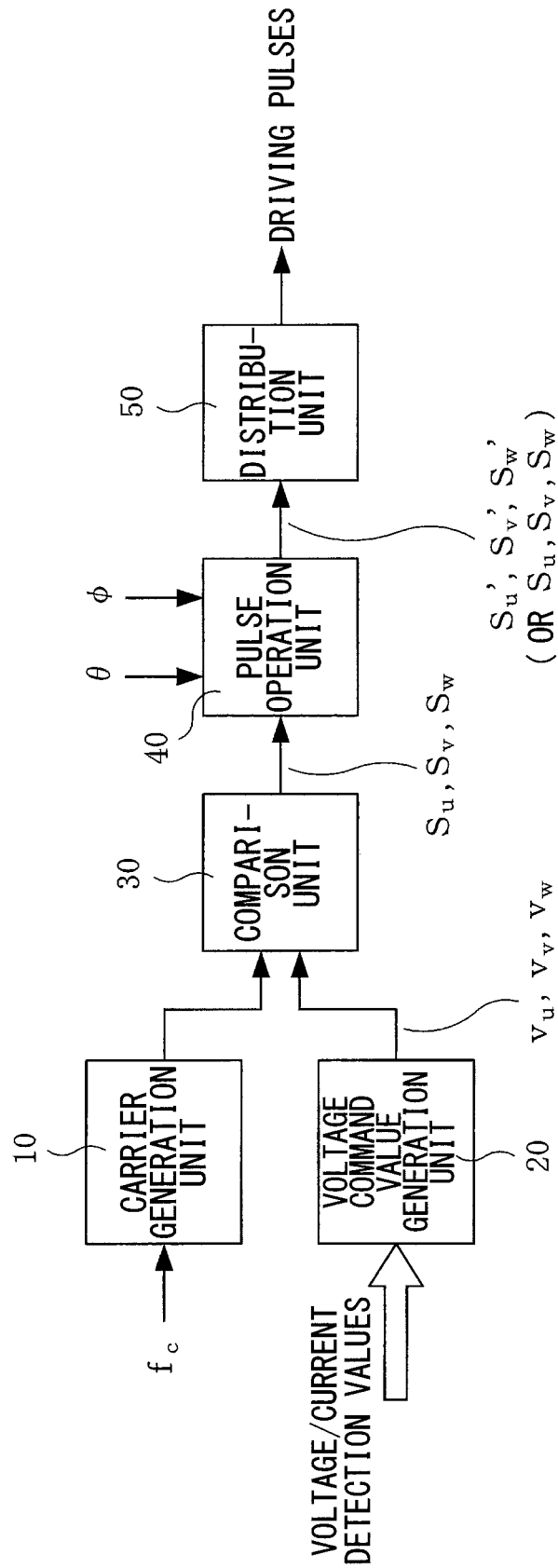
FIGS. 9A and 9B are functional block diagrams of a control device that is used in the embodiment of the present invention.
Figure 9B:
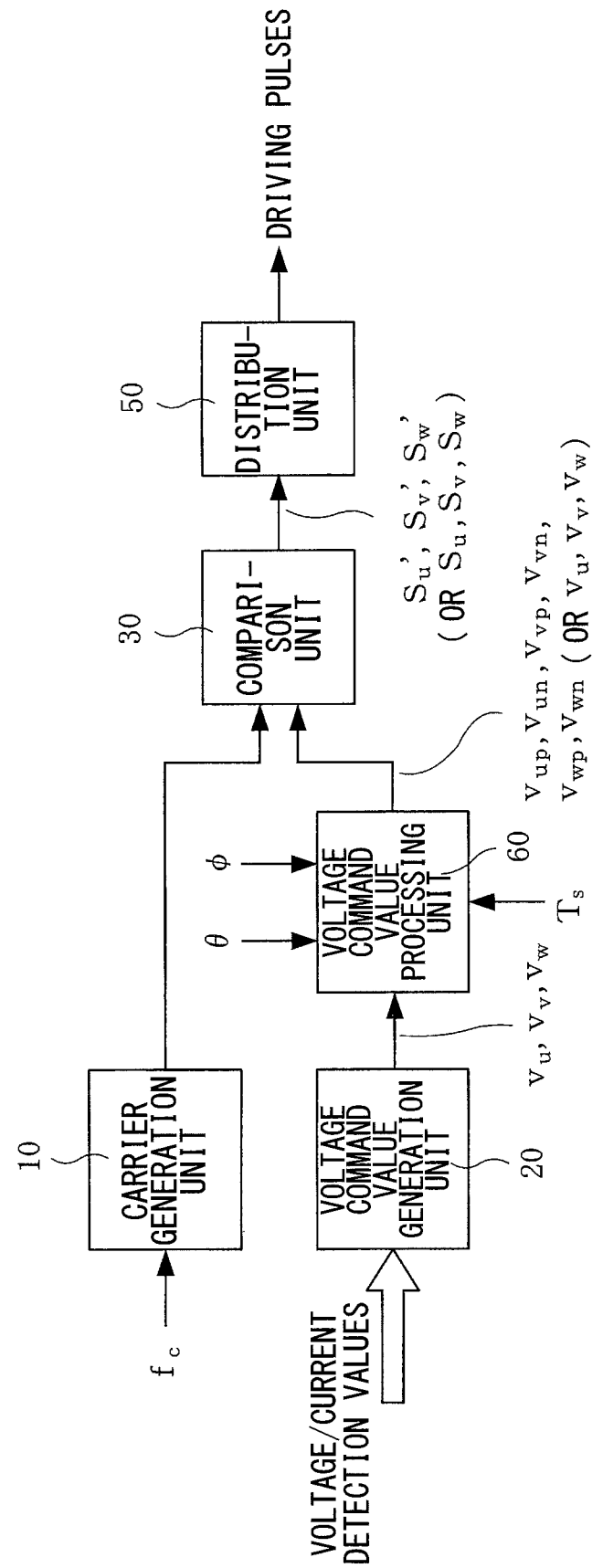

Here, FIGS. 9A and 9B are functional block diagrams of a control device for generating predetermined PWM pulses according to the present embodiment. Each function of the control device illustrated in FIGS. 9A and 9B can be realized by hardware included in a general-purpose microcomputer and software mounted on this hardware.

FIG. 9A is a functional block diagram in a case of shifting predetermined PWM pulses in one carrier cycle as described above.

In FIGS. 9A and 9B, a carrier generation unit 10 generates a carrier (triangle wave) based on a carrier frequency $f_c$. A voltage command value generation unit 20 receives, as inputs, voltage/current detection values of respective phases of the inverter and generates voltage command values $v_u$, $v_v$, and $v_w$. A comparison unit 30 compares the carrier with the voltage command values $v_u$, $v_v$, and $v_w$ to generate normal PWM pulses $S_u$, $S_v$, and $S_w$ by a carrier comparison system.

Also, a pulse operation unit 40 performs shift operation according to the present embodiment based on the voltage phase angle θ, the power factor angle φ, and the like to obtain pulses $S_u'$, $S_v'$, and $S_w'$, and selects and outputs either normal PWM pulses $S_u$, $S_v$, and $S_w$ input from the comparison unit 30 or the obtained pulses $S_u'$, $S_v'$, and $S_w'$. Further, a distribution unit 50 generates and distributes, based on the input PWM pulses, driving pulses with respect to respective switching elements of the inverter.

Next, when a triangle wave is used as a carrier, shift operations of PWM pulses can also be realized by the following method. The functional block diagram illustrated in FIG. 9B is used in a case of changing the voltage command values in a staircase manner as will be described below.

Figure 5A:
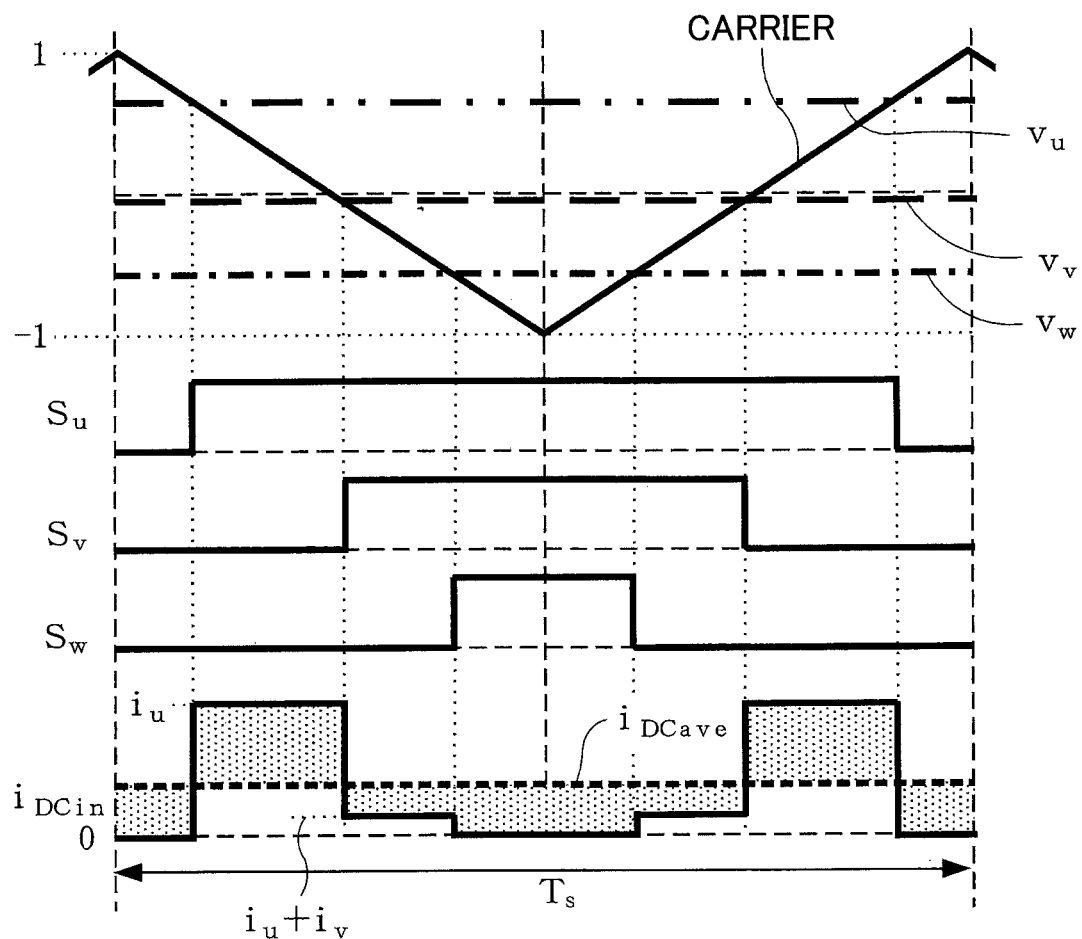
FIGS. 5A and 5B are waveform diagrams that describe an operation method of pulses in PWM control of a triangle wave comparison system.
Figure 5B:
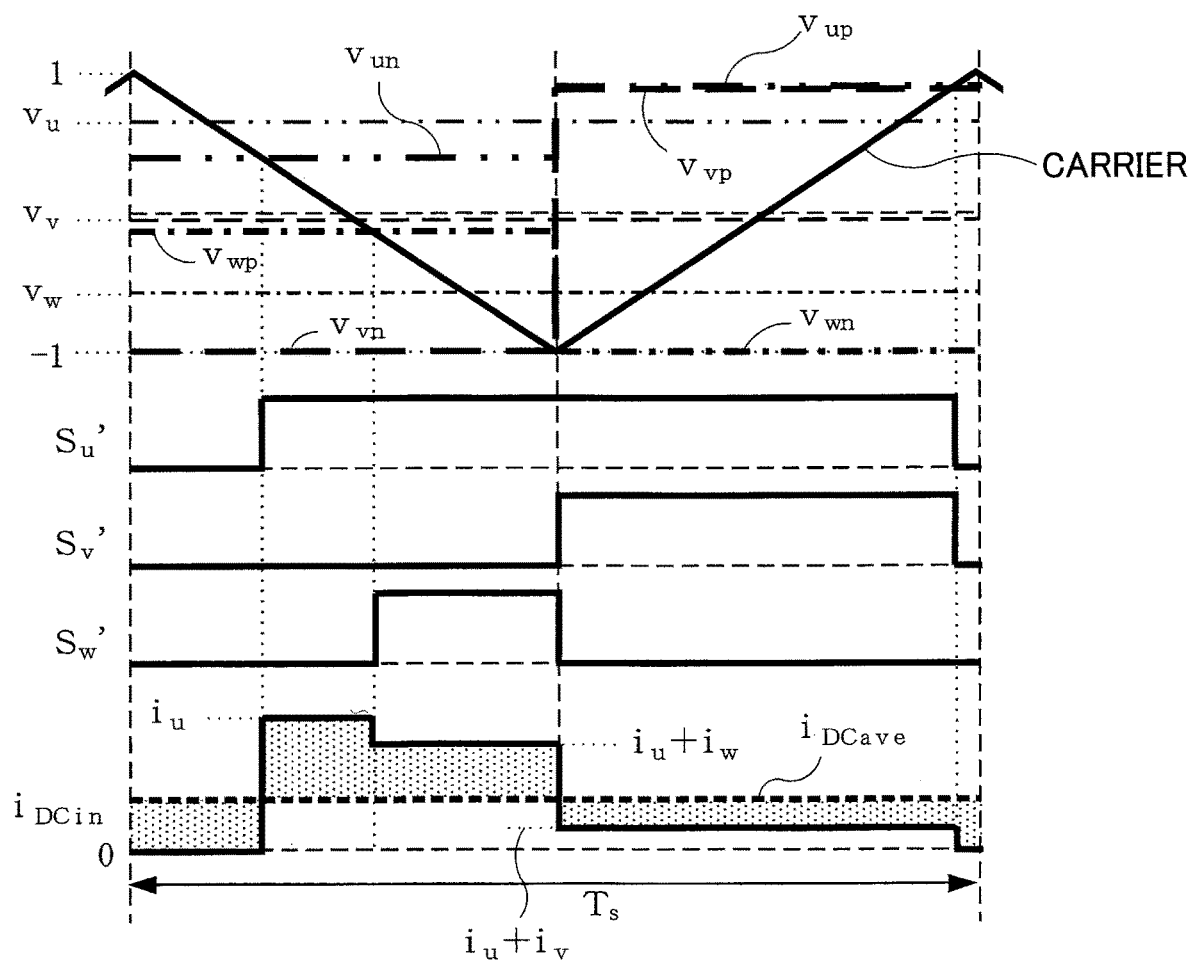

FIGS. 5A and 5B are waveform diagrams in cases where the positive side pulse width of the U phase is the largest and the positive side pulse width of the U phase encompasses the positive side pulses of the V phase and the W phase. FIG. 5A is a waveform diagram of a case due to a normal triangle wave comparison system, and FIG. 5B is a waveform diagram of a case in which the voltage command values are changed in one carrier cycle to shift the PWM pulses.

In FIG. 5B, as recited in the seventh aspect, the voltage command values of the respective phases are voltage command values such that output voltages in a predetermined period within one cycle of the triangle wave are equal to or greater than time-averaged values of target voltages to be output within the one cycle, and output voltages in a remaining period within the one cycle are less than the time-averaged values of the target voltages. Further, the voltage command values of the respective phases within one cycle are equal to the time-averaged values of the respective target voltages. That is, by changing the voltage command values in a staircase manner at the rise and the drop of a triangle wave where which the voltage command values of the respective phases within one cycle are equal to the time-averaged values of respective target voltages, and by making the average values thereof equal to the values before being changed, the pulses $S_u'$, $S_v'$, and $S_w'$ whose respective generation timings have been shifted are obtained while maintaining the pulse widths of the respective phases within the cycle $T_s$. Note that in FIG. 5B, $v_{up}$ to $v_{wn}$ are voltage command values for each half cycle of the respective phases. Also, the voltage command value processing unit 60 of FIG.

9B processes (increases/decreases), in accordance with the voltage phase angle θ and the power factor φ, the voltage command values $v_u$, $v_v$, $v_w$ at each half cycle of the carrier cycle $T_s$ to generate $v_{up}$ to $v_{wn}$. Also, the comparison unit 30 compares these respective $v_{up}$ to $v_{wn}$ with the triangle wave to generate the pulses $S_u'$, $S_v'$, and $S_w'$. Note that in a case of using a normal triangle wave system, of FIG. 5A that does not change the voltage command values in a staircase manner, the voltage command value processing unit 60 outputs the input $v_u$, $v_v$, and $v_w$ without any change, and the comparison unit 30 compares these respective $v_u$, $v_v$, and $v_w$ with the triangle wave to generate pulses $S_u$, $S_v$, and $S_w$.

FIGS. 5A and 5B illustrate the cases in which only $i_u$ is positive and $i_v$ ($=-(i_u+i_w)$) and $i_w$ ($=-(i_u+i_v)$) are negative in which $i_{DCin}$ of FIG. 5B takes at a positive value in a wider range than that in FIG. 5A.

As can be seen from the comparison of FIGS. 5A and 5B, by shifting the pulses, the areas of the hatched portions are reduced and $i_{CRMS}$ is reduced.

Figure 6A:
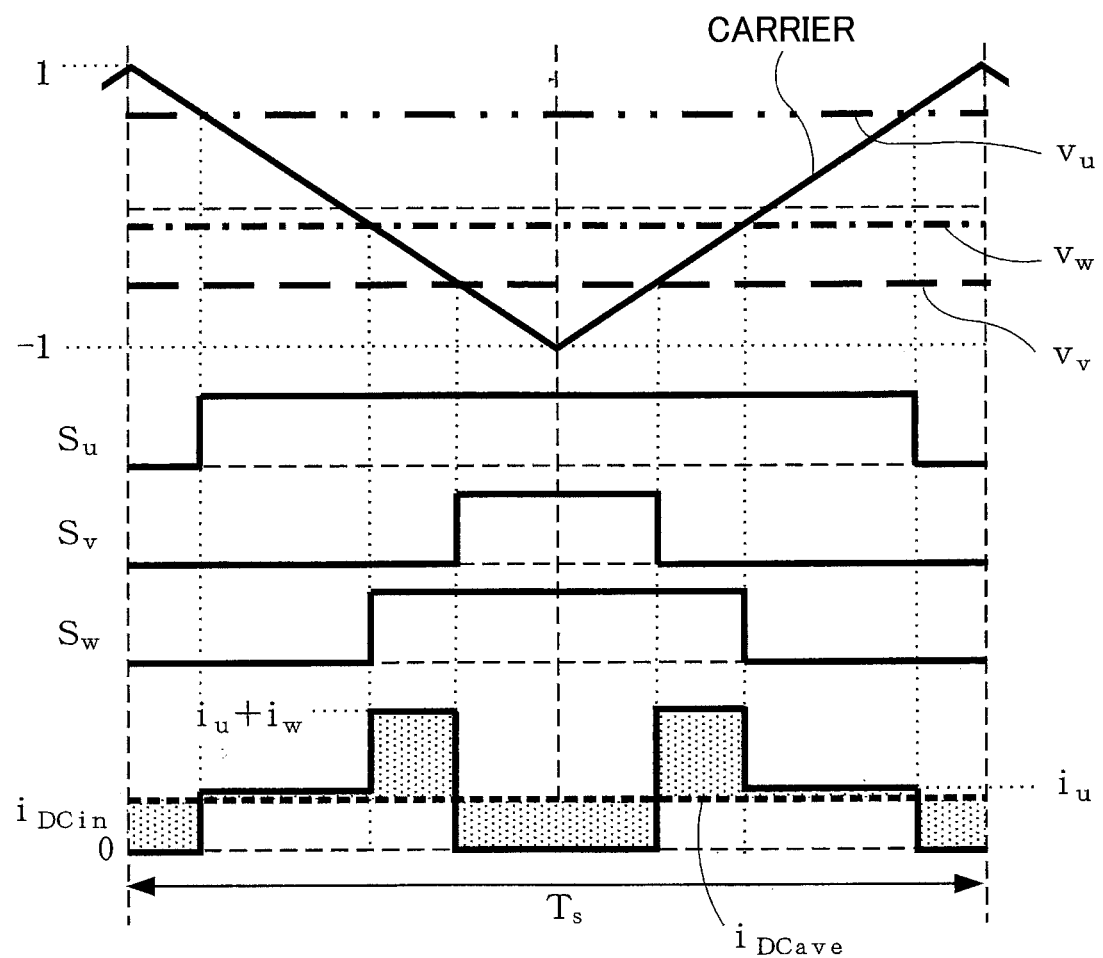
FIGS. 6A and 6B are waveform diagrams that describe an operation method of pulses in PWM control of a triangle wave comparison system.
Figure 6B:
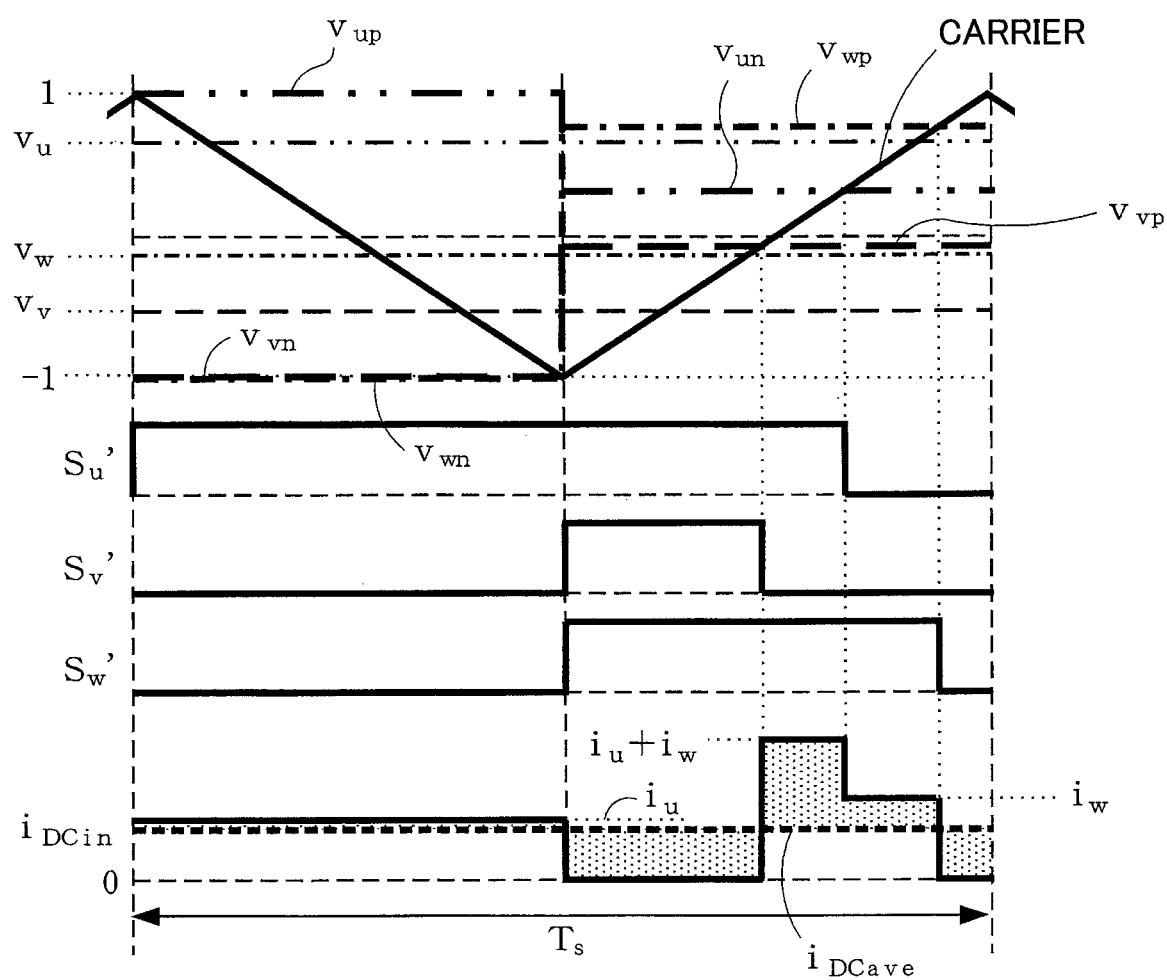

On the other hand, FIGS. 6A and 6B are waveform diagrams in example cases where the negative side pulse width of the V phase is the largest and the negative side pulse width of the V phase encompasses the negative side pulses of the U phase and the W phase. FIG. 6A is a waveform diagram of a case due to a normal triangle wave comparison system, and FIG. 6B is a waveform diagram of a case in which the voltage command values are changed in one carrier cycle to shift the PWM pulses.

FIGS. 6A and 6B illustrate the cases in which only $i_v$ ($=-(i_u+i_w)$) is negative and $i_u$ and $i_w$ are positive in which $i_{DCin}$ of FIG. 6B takes at a positive value in a wider range than that in FIG. 6A.

Also, as can be seen from the comparison of FIGS. 6A and 6B, by shifting the pulses, the areas of the hatched portions are reduced and $i_{CRMS}$ is reduced.

Note that in FIG. 6B, the negative side pulse of the U phase voltage overlaps with the negative side pulse of the W phase voltage at the right end portion of the waveform. This is a feature that occurs, when, in PWM control using, as a carrier, a triangle wave that drops in the first half and rises in the second half, voltage command values are changed in a staircase manner at the rise and the drop of the triangle wave. That is, in such a case, there may be a case in which while the pulse width of one whose negative side pulse width is the largest (V phase pulse in FIG. 6B) encompasses the negative side pulses of the other two phases, it is inevitable that the negative side pulses of the other two phases overlap. Therefore, in this case, the voltage command values may be changed in a staircase manner so as to reduce the overlapping range of the negative side pulses of the other two phases as small as possible.

Specifically, with respect to the negative side pulses, the pulses are shifted such that a phase whose negative side pulse width is the largest and a phase whose negative side pulse width is the next largest are aligned such that the rise portions or the drop portions of both pulses are aligned with each other and the aligned point maximally approaches the center of one cycle of the triangle wave. Further, with respect to the remaining one phase, that is, with respect to the pulse of the phase whose negative side pulse width is the smallest, it may be shifted maximally in the range encompassed in the largest negative side pulse width in the direction opposite to the above shift direction.

Although not illustrated, in a case of performing PWM control of a triangle wave comparison using a triangular wave that rises in the first half and drops in the second half, it is sufficient to perform shift in a similar way for the positive side pulses.

Note that performing triangle wave comparison on voltage command values that are substantially constant within the period $T_s$ without changing the voltage command values as described above is a normal triangle wave comparison system. Therefore, as illustrated in FIG. 5B and FIG. 6B, depending on whether to change the voltage command values in a staircase manner or not, it is possible to easily switch between the second control mode for shifting the pulses and the first control mode according to the normal triangle wave comparison system.

Next, FIGS. 7A to 7D correspond to the eighth and ninth aspects of the invention, and describe a method of suppressing shock when switching various modes of a pulse operation.

As described above, various modes of pulse operation are switched in accordance with a voltage phase angle and a power factor. At the time of switching modes, if a PWM pulse suddenly changes, a current also suddenly changes, which may be undesirable for the load in some cases. For example, torque fluctuation occurs in a case where the load is an electric motor, or power supply disturbance occurs in a case where a power supply is connected to the load portion. Here, a method for avoiding these problems will be described.

There are two types of mode switching that are "mode switching A" corresponding to the repetition for each 60° of the voltage phase angle and "mode switching B" that occurs in the 60° (switching between the shift operation mode (1), (2), or "x" described with reference to FIGS. 3A to 3G).

First, "mode switching B" will be described.

Figure 7A:
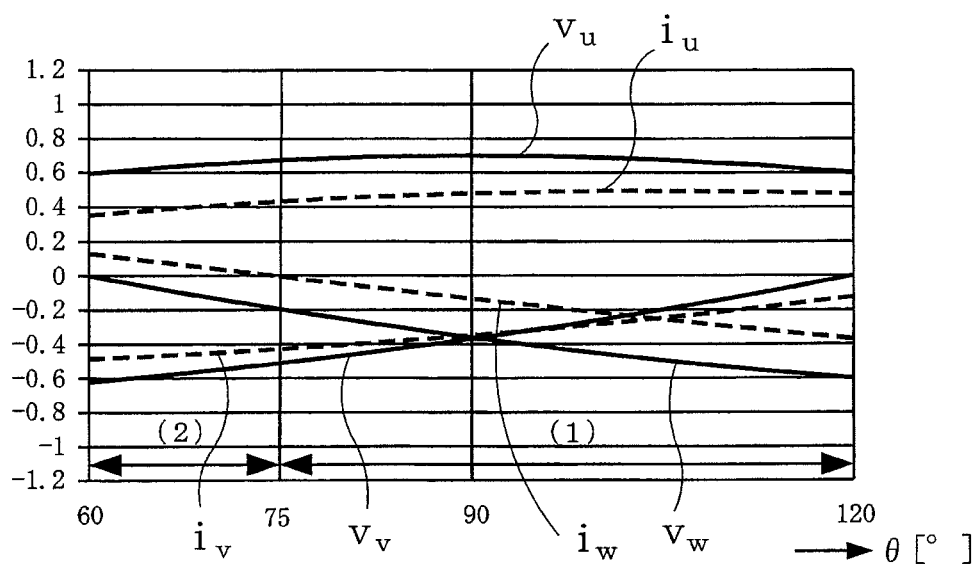
FIGS. 7A to 7D are waveform diagrams that describe an operation method of pulses when switching modes.
Figure 7B:
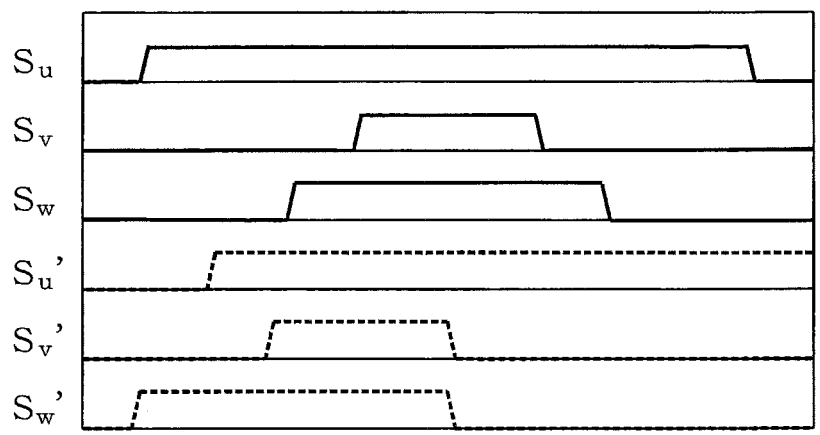
Figure 7C:
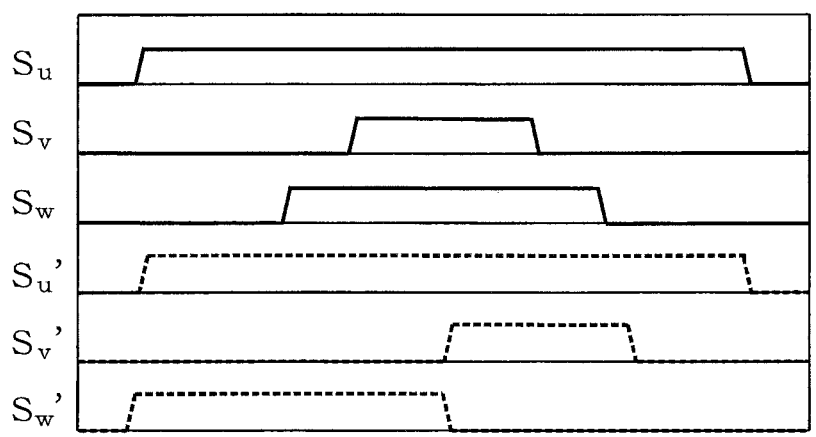
Figure 7D:
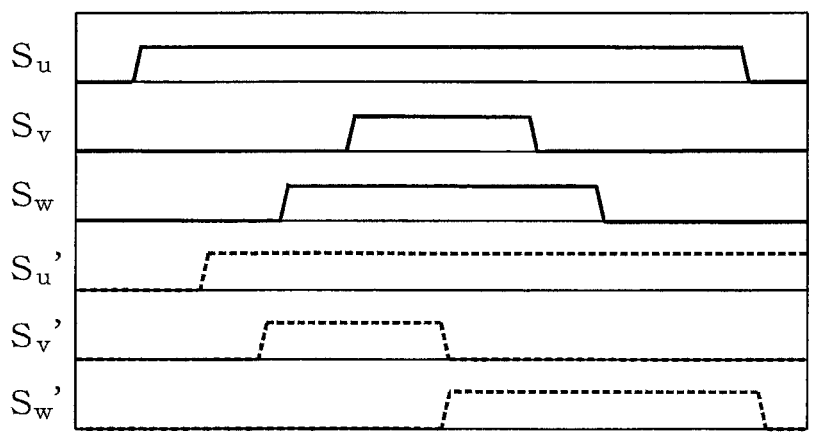

FIGS. 7A to 7D illustrate switching to the shift operation mode (1) from the shift operation mode (2), as illustrated in FIG. 3B or FIG. 3C, that is, FIGS. 7A to 7D illustrate a state of switching between modes of shifting pulses. FIG. 7A is a waveform diagram of voltages and currents in a case where the power factor angle φ is −15° similarly to FIG. 3B. FIGS. 7B and 7C respectively illustrate the shift operation mode (2) and the shift operation mode (1). That is, FIGS. 7B and 7C illustrate pulses immediately before and immediately after switching timing.

As can be seen from the comparison of FIGS. 7B and 7C, the pulses ($S_u$, $S_v$, and $S_w$) before being operated are very similar as a matter of course. Also, the major difference between FIG. 7B and FIG. 7C is that the position of the V phase pulse $S_v'$ after being shifted moves from the first half to the second half of the triangle wave. On the other hand, the position of the U phase pulse $S_u'$ slightly moves forward and the position of the W phase pulse $S_w'$ is substantially the same.

In this way, by operating the pulses so as to change the generation timing of the V phase pulse $S_v'$ whose positive side pulse width is the smallest before and after switching, it is possible to suppress the changes of the pulses state before and after the switching. Moreover, because the changes in the positions of the pulses occur at the center portion of one cycle of the triangular wave, the changes of the pulses before and after the switching occur approximately after one cycle of the triangular wave, and shock is small as compared with a case where changes occurs near the switching of one cycle of adjacent triangle waves, for example.

In this way, changing the generation timing of the pulse of a phase whose positive side pulse width is the smallest before and after switching corresponds to the eighth aspect of the invention.

As a possibility that can be taken by mode switching B, as illustrated in FIG. 7B, it is also considered to obtain a W phase pulse $S_w'$ by changing the pulse position of the W phase whose positive side pulse width is between the largest and the smallest from the state of FIG. 7B in an opposite direction with respect to the center of one cycle of the triangle wave.

In this case, the positions of the U phase pulse $S_u'$ and the V phase pulse $S_v'$ are unchanged before and after the switching, and it can be said that the shock is small in that it is sufficient to change the position of a pulse only for one phase before and after the switching.

As described above, changing the generation timing of the pulse of a phase whose positive side pulse width is between the maximum and the smallest before and after switching corresponds to the ninth aspect of the invention.

Figure 8A:
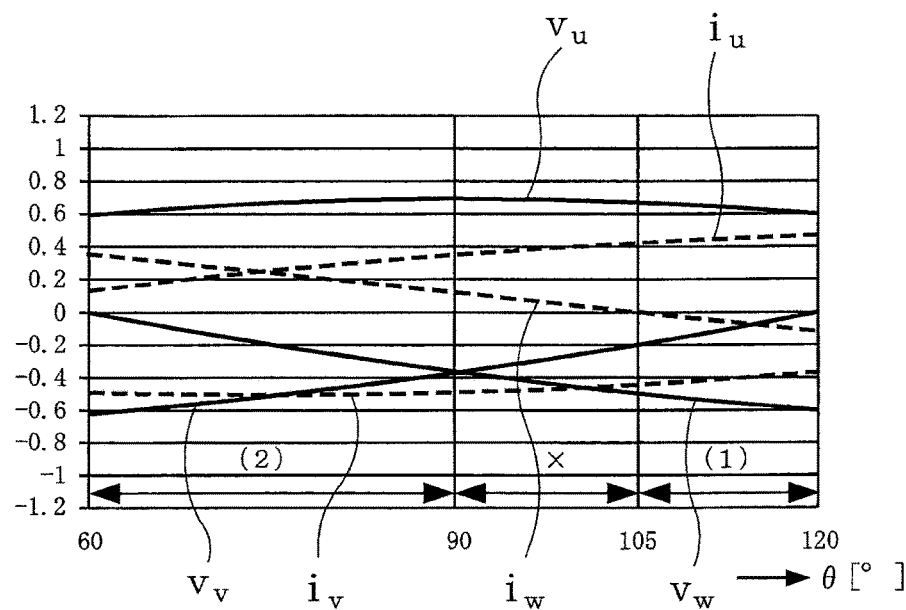
FIGS. 8A to 8C are waveform diagrams that describe an operation method of pulses when switching modes.
Figure 8B:
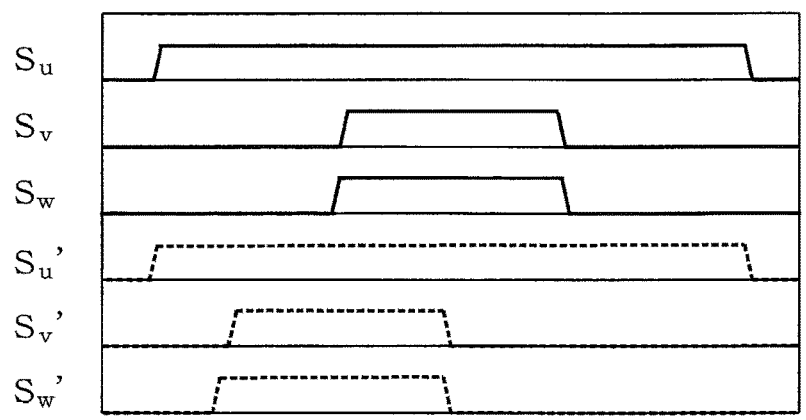
Figure 8C:
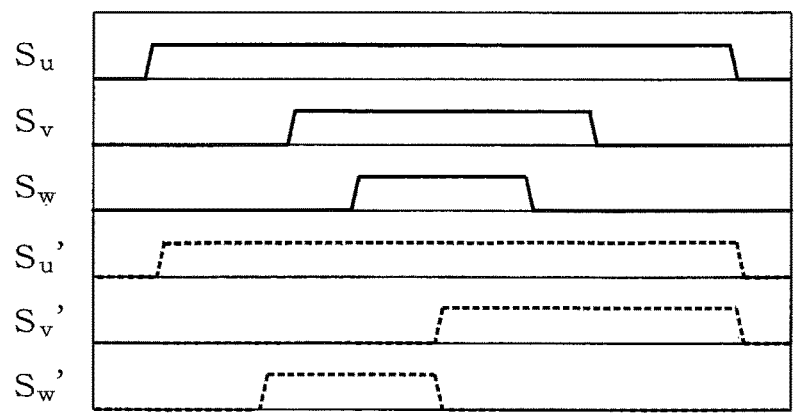

Next, FIGS. 8A to 8D illustrate a case of switching between the shift operation mode (1) or the shift operation (2) and "x" illustrated in FIGS. 3D to 3F. That is, FIGS. 8A to 8D illustrate a case of switching between a mode of performing an operation of the pulses and a mode of not performing an operation of the pulses. FIG. 8A is a waveform diagram of voltages and currents in a case where the power factor angle φ is −45° similarly to FIG. 3D. FIGS. 8B and 8C illustrate states of the pulses at switching timings respectively from the shift operation mode (2) to "x" and "x" to the shift operation mode (1). Note that in a case of "x", because the pulses are not switched, the pulses before being changed as in the same figure are adopted.

First, referring to FIG. 8B, in the shift operation mode (2), the pulses $S_v$ and $S_w$ of the phases (the V phase and the W phase) other than the U phase having the largest positive side pulse width substantially overlap with each other, and in mode switching, these pulses move forward of one cycle of the triangle wave and become $S_v'$ and $S_w'$. Therefore, without performing any special operation, a sudden change does not occur in one cycle of the triangle wave before and after the switching.

On the other hand, referring to FIG. 8C, the pulses $S_v$ and $S_w$ of the above described two phases (the V phase and the W phase) located at the center portion of one cycle of the triangle wave are divisionally arranged in the rise portion and the drop portion of the triangle wave to be $S_v'$ and $S_w'$ after being switched. In this case, in order to relatively suppress a sudden change in one cycle of the triangular wave before and after switching, the pulses may be arranged such that the pulse whose positive side pulse width is short, that is, $S_w'$ occurs first.

By performing an operation as described above operation, it is possible to mitigate a shock in a case where mode switching occurs within a 60° range of the voltage phase angle and to realize a smooth operation.

Next, with respect to "mode switching A" corresponding to repetition for every 60° of the voltage phase angle described above, it is possible to mitigate switching shock by adopting the method described by "mode switching B" as appropriate.

For example, in the 60° period before the period of 60° to 120° of the voltage phase angle described above, only the polarity of the V phase voltage $v_v$ is negative and the amplitude of the V phase voltage $v_v$ is the largest.

The situations for respective power factors illustrated in FIGS. 3A to 3G in switching between these two consecutive 60° periods are as follows.

Power factor angle 0°: same as the switching of the shift operation mode (2) the shift operation mode (1)

0° to −60° of power factor angle: continue the shift operation mode (2) (no switching)

Power factor angle −60°: same as the switching of "x"→the shift operation mode (2)

−60° to −90° of power factor angle: continue "x" (no switching)

As described above, also in "mode switching A", by applying the method described for "mode switching B" as appropriate, it is possible to mitigate the shock at the time of switching.

What is claimed is:

1. A three-phase inverter comprising:
three series circuits that are connected in parallel to a capacitor connected in parallel to a DC voltage source,
wherein each of the three series circuits includes two semiconductor switching elements that are connected in series,
wherein a connection point between the two semiconductor switching elements is used as an AC output terminal for each phase,
wherein the three-phase inverter controls, for each predetermined switching cycle, the semiconductor switching elements based on PWM pulses for respective phases, and
wherein the three-phase inverter switches a first control mode and a second control mode to generate PWM pulses,
wherein, in the first control mode, the three-phase inverter generates either
PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is in a state in which a positive side pulse of one phase encompasses a positive side pulse of the other pulse; or
PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is in a state in which a negative side pulse of one phase encompasses a negative side pulse of the other pulse, and
wherein, in the second control mode, the three-phase inverter generates either
PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse or
PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse, wherein the first control mode and the second control mode are switched in accordance with polarities or a magnitude relationship of voltages and currents output by the three-phase inverter.

2. The three-phase inverter according to claim 1, wherein when the three-phase inverter generates PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse, the positive side pulse of the phase, whose pulse width is the largest, encompasses the positive side pulses of the other two phases.

3. The three-phase inverter according to claim 1, wherein when the three-phase inverter generates PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse, the negative side pulse of the phase, whose pulse width is the largest, encompasses the negative side pulses of the other two phases.

4. The three-phase inverter according to claim 1,
wherein the three-phase inverter compares voltage command values of the respective phases with a triangle wave that is a carrier to generate PWM pulses of the three phases,
wherein the voltage command values of the respective phases are voltage command values such that output voltages in a predetermined period within one cycle of the triangle wave are equal to or greater than time-averaged values of target voltages to be output within the one cycle, and output voltages in a remaining period within the one cycle are less than the time-averaged values of the target voltages, and
wherein the voltage command values of the respective phases within the one cycle are equal to the time-averaged values of the respective target voltages.

5. The three-phase inverter according to claim 1,
wherein a first mode and a second mode are switchable,
wherein the first mode uses PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse,
wherein the second mode uses PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse, and
wherein, when switching the first mode and the second mode, a generation timing of a PWM pulse of a phase whose positive side pulse width is the smallest is changed before and after the switching.

6. The three-phase inverter according to claim 1,
wherein a first mode and a second mode are switchable,
wherein the first mode uses PWM pulses of three phases including a PWM pulse of one phase, whose pulse width of a positive side pulse in one switching cycle is the largest among the PWM pulses of the three phases, and including PWM pulses of the other two phases such that a positional relationship between positive side pulses of the other two phases is a positional relationship in which an overlapping range on a time axis is smaller as compared with a state in which a positive side pulse of one phase encompasses a positive side pulse of the other pulse,
wherein the second mode uses PWM pulses of three phases including a PWM pulse of one phase, whose pulse width of a negative side pulse in one switching cycle is the largest among the PWM pulses of the three phases, and including PWM pulses of the other two phases such that a positional relationship between negative side pulses of the other two phases is a positional relationship in which an overlapping range on a time axis is smaller as compared with a state in which a negative side pulse of one phase encompasses a negative side pulse of the other pulse, and
wherein, when switching the first mode and the second mode, a generation timing of a PWM pulse of a phase whose positive side pulse width is between the largest and the smallest is changed before and after the switching.

7. The three-phase inverter according to claim 1,
wherein one of the positive side pulses of the other two phases is shifted to one side with respect to a center of the largest positive side pulse and the other of the positive side pulses of the other two phases is shifted to the other side with respect to the center of the largest positive side pulse.

8. The three-phase inverter according to claim 1,
wherein when the power factor angle is a first predetermined angle, the three-phase inverter selects the second mode regardless of the voltage phase angle,
wherein when the power factor angle is a second predetermined angle, the three-phase inverter selects the first mode regardless of the voltage phase angle, and
wherein when the power factor angle is in a range of from the first predetermined angle to the second predetermined angle, not inclusive of the first and second predetermined angles, the three-phase inverter selects the first mode or the second mode in accordance with the voltage phase angle.

\* \* \* \* \*